(12) United States Patent
Tsuji et al.

(10) Patent No.: US 10,298,941 B2
(45) Date of Patent: May 21, 2019

(54) VIDEO ENCODING DEVICE, VIDEO ENCODING METHOD, AND PROGRAM

(71) Applicant: NEC Corporation, Minato-ku, Tokyo (JP)

(72) Inventors: Naoya Tsuji, Tokyo (JP); Takayuki Ishida, Tokyo (JP); Suguru Nagayama, Tokyo (JP); Kensuke Shimofure, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 15/111,239

(22) PCT Filed: Jan. 22, 2015

(86) PCT No.: PCT/JP2015/000286
§ 371 (c)(1),
(2) Date: Jul. 13, 2016

(87) PCT Pub. No.: WO2015/118826
PCT Pub. Date: Aug. 13, 2015

(65) Prior Publication Data
US 2016/0337652 A1    Nov. 17, 2016

(30) Foreign Application Priority Data
Feb. 10, 2014    (JP) ................................ 2014-023090

(51) Int. Cl.
*H04N 19/40*    (2014.01)
*H04N 19/70*    (2014.01)
(Continued)

(52) U.S. Cl.
CPC ............. *H04N 19/40* (2014.11); *H04N 19/11* (2014.11); *H04N 19/147* (2014.11);
(Continued)

(58) Field of Classification Search
None
See application file for complete search history.

(56) References Cited

U.S. PATENT DOCUMENTS

2011/0032988 A1    2/2011   Chiba et al.
2012/0275516 A1    11/2012  Tanaka et al.
(Continued)

FOREIGN PATENT DOCUMENTS

| JP | 2006-279724 A | 10/2006 |
| JP | 2012-104940 A | 5/2012 |
| WO | 2015/033510 A1 | 3/2015 |

OTHER PUBLICATIONS

Shen et al., "Ultra Fast H.264/AVC to HEVC Transcoder," 2013 Data Compression Conference, Mar. 20, 2013, pp. 241-250.*
(Continued)

*Primary Examiner* — Thai Q Tran
*Assistant Examiner* — Christopher Braniff

(57) ABSTRACT

A video encoding device includes a coded data transcoding section 131 for transcoding first coded data generated by a first video encoding section 11 to generate second coded data, wherein the coded data transcoding section 131 includes: a prediction mode adding section 1312 for generating intra prediction modes unusable by the first video encoding section 11 and usable by a second video encoding section 14; and a prediction mode selecting section 1313 for evaluating the prediction modes generated by the prediction mode adding section 1312 and, based on the evaluation results, selecting a prediction mode used by the second video encoding section 14.

16 Claims, 25 Drawing Sheets

(51) Int. Cl.
*H04N 19/91* (2014.01)
*H04N 19/11* (2014.01)
*H04N 19/176* (2014.01)
*H04N 19/159* (2014.01)
*H04N 19/147* (2014.01)
*H04N 19/96* (2014.01)

(52) U.S. Cl.
CPC ......... *H04N 19/159* (2014.11); *H04N 19/176* (2014.11); *H04N 19/70* (2014.11); *H04N 19/91* (2014.11); *H04N 19/96* (2014.11)

(56) References Cited

U.S. PATENT DOCUMENTS

2013/0266063 A1   10/2013   Jun et al.
2016/0301941 A1   10/2016   Chono et al.

OTHER PUBLICATIONS

Zhao et al., "Fast Mode Decision Algorithm for Intra Prediction in HEVC," 2011 IEEE Visual Communications and Processing (VCIP), Nov. 6, 2011, pp. 1-4.*

Dong Zhang et al. "Fast Transcoding from H.264 AVC to High Efficiency Video Coding", Multimedia and Expo (ICME), 2012 IEEE International Conference on, IEEE, Jul. 9, 2012, pp. 651-656.

Xingang Liu et al. "Low Complexity Intra Prediction Algorithm for MPEG-2 to H.264/AVC Transcoder", IEEE Transactions on Consumer Electronics, IEEE Service Center, New York, NY, US, vol. 56, No. 2, May 1, 2010, pp. 387-994.

Zhang Jian et al. "A Fast Algorithm for Intra Downsizing in H.264/AVC Transcoding", Computing, Communication, Control, and Management, 2008. CCCM '08. ISECS International Colloquium on, IEEE, Piscataway, NJ, USA, Aug. 3, 2008, pp. 496-499.

Samuele Pasqualini et al. "Adaptive Threshold for Intra Frame Prediction in H.263 to H.264 Smart-Transcoder", Advanced Communication Technology, 2008. ICACT 2008. 10th International Conference on, IEEE, Piscataway, NJ, USA, Feb. 17, 2008, pp. 1439-1444.

Extended European Search Report for EP Application No. EP15745901.7 dated Aug. 14, 2017.

International Telecommunication Union, "Advanced video coding for generic audiovisual services", Series H: Audiovisual and Multimedia Systems, Infrastructure of audiovisual services—Coding of moving video, ITU-T H.264, Jun. 2011.

International Telecommunication Union, "High efficiency video coding", Series H: Audiovisual and Multimedia Systems, Infrastructure of audiovisual services—Coding of moving video, Recommendation ITU-T H.265, Apr. 2013.

Benjamin Bross et al, "High efficiency video coding (HEVC) text specification draft 7", ITU-T SG16 WP3 and ISO/IEC JTC1/SC291WG11 12th Meeting: Geneva, CH, Apr. 27-May 7, 2012.

Tong Shen et al., "Ultra Fast H.264/AVC to HEVC Transcoder" 2013 Data Compression Conference (DCC), Mar. 20, 2013 pp. 241-250.

Liang Zhao et al., "Fast mode decision algorithm for intra prediction in HEVC" 2011 IEEE Visual Communications and Image Processing (VCIP) Nov. 6, 2011, pp. 1-4.

Ajit Singh Motra et al., "Fast intra mode decision for HEVC video encoder" 2012 20th International Conference on Software, Telecommunications and Computer Networks (SoftCOM), Sep. 11, 2012, pp. 1-5.

International Search Report for PCT Application No. PCT/JP2015/000286, dated Apr. 14, 2015.

Written opinion for PCT Application No. PCT/JP2015/000286.

Japanese Office Action for JP Application No. 2015-561201 dated Jul. 24, 2018 with English Translation.

* cited by examiner

```
typedef struct
{
  mb_type;
  sub_mb_type[4];
  ref_idx_l0[4];
  ref_idx_l1[4];
  mv_l0[4][4][2];
  mv_l1[4][4][2];
  intra_lumaNxN_pred[4][4];
  intra_chroma_pred;
  transform_size_8x8_flag;
  cbp;
} AVCMB
```

```
typedef struct
{
  cu_size[4];
  tu_size[4];
  pred_mode_flag[4];
  part_mode[4];
  ref_idx_l0[4];
  ref_idx_l1[4];
  mv_l0[4][4][2];
  mv_l1[4][4][2];
  intra_lumaNxN_pred[4][4];
  intra_chroma_pred[4];
} HEVCCB
```

FIG. 25

| AVC | | HEVC | | | | |
|---|---|---|---|---|---|---|
| mb_type | intra_lumaNxN_pred | cu_size | tu_size | pred_mode_flag | part_mode | intra_lumaNxN_pred |
| Intra_16x16 | V | 16 | 4 | 1 | 2Nx2N | INHERITANCE |
| Intra_16x16 | H | 16 | 4 | 1 | 2Nx2N | INHERITANCE |
| Intra_16x16 | DC | 16 | 4 | 1 | 2Nx2N | INHERITANCE |
| Intra_16x16 | Plane | 16 | 4 | 1 | 2Nx2N | Planar |
| Intra_8x8 | ALL PREDICTION DIRECTIONS ARE SAME IN MB | 16 | 8 | 1 | 2Nx2N | INHERITANCE |
| Intra_8x8 | OTHER | 8 | 8 | 1 | 2Nx2N | INHERITANCE |
| Intra_4x4 | ALL PREDICTION DIRECTIONS ARE SAME IN MB | 16 | 4 | 1 | 2Nx2N | INHERITANCE |
| Intra_4x4 | ALL PREDICTION DIRECTIONS ARE SAME IN 8x8 SUBBLOCK | 8 | 4 | 1 | 2Nx2N | INHERITANCE |
| Intra_4x4 | OTHER | 8 | 4 | 1 | NxN | INHERITANCE |

FIG. 26

| AVC | | HEVC | | | | |
|---|---|---|---|---|---|---|
| mb_type | intra_lumaNxN_pred | cu_size | tu_size | pred_mode_flag | part_mode | intra_lumaNxN_pred |
| P_Skip | NA | 16 | 4 << transform_size_8x8_flag | 0 | 2Nx2N | NA |
| P_inter_16x16 | NA | 16 | 4 << transform_size_8x8_flag | 0 | 2Nx2N | NA |
| P_inter_16x8 | NA | 16 | 4 << transform_size_8x8_flag | 0 | 2NxN | NA |
| P_inter_8x16 | NA | 16 | 4 << transform_size_8x8_flag | 0 | Nx2N | NA |
| P_8x8 | NA | 16 | 4 << transform_size_8x8_flag | 0 | 2Nx2N | NA |
| Intra_16x16 | V | 16 | 4 | 1 | 2Nx2N | INHERITANCE |
| Intra_16x16 | H | 16 | 4 | 1 | 2Nx2N | INHERITANCE |
| Intra_16x16 | DC | 16 | 4 | 1 | 2Nx2N | INHERITANCE |
| Intra_16x16 | Plane | 16 | 8 | 1 | 2Nx2N | Planar |
| Intra_8x8 | ALL PREDICTION DIRECTIONS ARE SAME IN MB | 16 | 8 | 1 | 2Nx2N | INHERITANCE |
| Intra_8x8 | OTHER | 8 | 8 | 1 | 2Nx2N | INHERITANCE |
| Intra_4x4 | ALL PREDICTION DIRECTIONS ARE SAME IN MB | 16 | 4 | 1 | 2Nx2N | INHERITANCE |
| Intra_4x4 | ALL PREDICTION DIRECTIONS ARE SAME IN 8x8 SUBBLOCK | 8 | 4 | 1 | 2Nx2N | INHERITANCE |
| Intra_4x4 | OTHER | 8 | 4 | 1 | NxN | INHERITANCE |

FIG. 27

| | AVC | | | HEVC | | | |
|---|---|---|---|---|---|---|---|
| mb_type | MV | intra_lumaNxN_pred | cu_size | tu_size | pred_mode_flag | part_mode | intra_lumaNxN_pred |
| B_Skip | ALL MOTION VECTORS ARE SAME IN MB | NA | 16x16 | 4 << transform_size_8x8_flag | 0 | 2Nx2N | NA |
| | NOT ALL MOTION VECTORS ARE SAME IN MB | NA | 8x8 | 4 << transform_size_8x8_flag | 0 | 2Nx2N | NA |
| B_Direct_16x16 | ALL MOTION VECTORS ARE SAME IN MB | NA | 16x16 | 4 << transform_size_8x8_flag | 0 | 2Nx2N | NA |
| | NOT ALL MOTION VECTORS ARE SAME IN MB | NA | 8x8 | 4 << transform_size_8x8_flag | 0 | 2Nx2N | NA |
| B_inter_16x16 | NA | NA | 16x16 | 4 << transform_size_8x8_flag | 0 | 2Nx2N | NA |
| B_inter_16x8 | NA | NA | 16x16 | 4 << transform_size_8x8_flag | 0 | 2NxN | NA |
| B_inter_8x16 | NA | NA | 16x16 | 4 << transform_size_8x8_flag | 0 | Nx2N | NA |
| B_8x8 | NA | NA | 8x8 | 4 << transform_size_8x8_flag | 0 | 2Nx2N | NA |
| Intra_16x16 | NA | V | 16 | 4 | 1 | 2Nx2N | INHERITANCE |
| Intra_16x16 | NA | H | 16 | 4 | 1 | 2Nx2N | INHERITANCE |
| Intra_16x16 | NA | DC | 16 | 4 | 1 | 2Nx2N | INHERITANCE |
| Intra_16x16 | NA | Plane | 16 | 4 | 1 | 2Nx2N | Planar |
| Intra_8x8 | NA | ALL PREDICTION DIRECTIONS ARE SAME IN MB | 16 | 8 | 1 | 2Nx2N | INHERITANCE |
| Intra_8x8 | NA | OTHER | 8 | 8 | 1 | 2Nx2N | INHERITANCE |
| Intra_4x4 | NA | ALL PREDICTION DIRECTIONS ARE SAME IN MB | 16 | 4 | 1 | 2Nx2N | INHERITANCE |
| Intra_4x4 | NA | ALL PREDICTION DIRECTIONS ARE SAME IN 8x8 SUBBLOCK | 8 | 4 | 1 | 2Nx2N | INHERITANCE |
| Intra_4x4 | NA | OTHER | 8 | 4 | 1 | NxN | INHERITANCE |

VIDEO ENCODING DEVICE, VIDEO ENCODING METHOD, AND PROGRAM

This application is a National Stage Entry of PCT/JP2015/000286 filed on Jan. 22, 2015, which claims priority from Japanese Patent Application 2014-023090 filed on Feb. 10, 2014, the contents of all of which are incorporated herein by reference, in their entirety.

FIELD OF THE INVENTION

The present invention relates to a video encoding device to which a technique for distributing the computational load of a video coding process is applied.

BACKGROUND OF THE INVENTION

As a video coding system aimed at transmitting and accumulating video information with high efficiency, there is a coding system in the ISO/IEC 14496-10 Advanced Video Coding (AVC) standard (hereinafter called H.264/AVC standard) described in Non-Patent Literature (NPL) 1. In the video coding system described in NPL 1, a frame is divided into blocks of 16×16 pixel size called macroblocks (MB), and each MB is encoded sequentially from top left of the frame. In the AH.264/AVC standard described in NPL 1, the MB is further divided into blocks of 4×4 pixel size, and each 4×4 block is encoded.

Intra prediction is prediction for generating a prediction image from a reconstructed image of a frame to be encoded. An intra prediction signal is a prediction signal generated based on an image of a reconstructed picture (typically stored in a buffer) that has the same display time as a current picture. In regard to intra prediction, as described in NPL 1, intra prediction modes of three block sizes, Intra_4×4, Intra_8×8, and Intra_16×16, are available.

Further, in a video coding system (H.265/HEVC system) based on NPL 2, each frame of digitized video is divided into coding tree units (CTUs), and each CTU is encoded in order of raster scanning. Each CTU is split into coding units (CUs) in a quadtree structure. Each CU is split into prediction units (PUs) and predicted. Further, a prediction error of each CU is divided into transform units (TUs) in the quadtree structure, and transformed. Hereafter, a CU of the largest size is called the maximum CU (LCU: Largest Coding Unit), and a CU of the smallest size is called the minimum CU (SCU: Smallest Coding Unit). Note that the LCU size and the CTU size are the same.

The CU is prediction-encoded by intra prediction or inter-frame prediction. The intra prediction and inter-frame prediction in the H.265/HEVC system will be described below.

In NPL 2, a total of 33 angular intra prediction (directional intra prediction) modes shown in FIG. 11 are defined. In FIG. 11, the arrows indicate prediction directions. The angular intra prediction is to extrapolate a reconstructed pixel around a block to be encoded into any of the 33 directions shown in FIG. 11 to generate an intra prediction signal. Note that the numerals indicate prediction mode numbers in FIG. 11. In addition to the total 33 angular intra prediction modes, DC intra prediction for averaging peripheral reconstructed pixels of a block to be encoded, and planar intra prediction for linearly interpolating the peripheral reconstructed pixels of the block to be encoded are defined in NPL 2. Hereinafter, a CU encoded based on intra prediction is called an intra CU.

The inter-frame prediction is prediction based on an image of a reconstructed frame (reference picture) that has a display time different from that of the frame to be encoded. Hereinafter, the inter-frame prediction may also called inter prediction. FIG. 12 is an explanatory diagram showing an example of inter-frame prediction. A motion vector MV= $(mv_x, mv_y)$ represents the extent of translation of a reconstructed image block of the reference picture with respect to a block to be encoded. The inter prediction generates an inter prediction signal based on the reconstructed image block of the reference picture (using pixel interpolation if necessary). Hereafter, a CU encoded based on the inter-frame prediction is called an inter CU.

Whether each CU is either an intra CU or an inter CU is signaled by the pred_mode_flag syntax described in NPL 2.

A frame encoded with only intra CUs is called an I frame (or an I picture). A frame encoded including inter CUs as well as intra CUs is called a P frame (or a P picture). A frame encoded including inter CUs for which not only one reference picture but two reference pictures are simultaneously used for inter prediction of a block is called a B frame (or a B picture).

Referring to FIG. 13, the configuration and operation of a typical video encoding device for outputting a bitstream using each CU of each frame of digitized video as an input image will be described.

The video encoding device shown in FIG. 13 includes a transformer/quantizer 1021, an inverse quantizer/inverse transformer 1022, a buffer 1023, a predictor 1024, an estimator 1025, and an entropy encoder 1056.

FIG. 14 is an explanatory diagram showing an example of CTU division of a frame t in the case where the frame has a spatial resolution of CIF (Common Intermediate Format) and the CTU size is 64, and an example of CU division of the eighth CTU (CTU 8) included in the frame t. FIG. 15 is an explanatory diagram showing a quadtree structure corresponding to the example of CU division of the CTU 8. The quadtree structure of each CTU, i.e., the CU partitioning shape is signaled by the split_cu_flag syntax described in NPL 2.

FIG. 16 is an explanatory diagram showing a PU partitioning shape of a CU. In the case of an intra CU, square PU division can be selected. In the case of an inter CU, rectangular PU division as well as the square can be selected. The PU partitioning shape of each CU is signaled by the part_mode syntax described in NPL 2.

FIG. 17 is an explanatory diagram showing an example of TU division of a CU. In the upper part, an example of TU division of an intra CU having a 2N×2N PU partitioning shape is shown. In the case of the intra CU, the root of the quadtree is assigned to a PU, and a prediction error for each PU is represented by a quadtree structure. In the lower part, an example of TU division of an inter CU having a 2N×N PU partitioning shape is shown. In the case of the inter CU, the root of the quadtree is assigned to the CU, and a prediction error for the CU is represented by a quadtree structure. The quadtree structure of the above prediction error, i.e., the TU partitioning shape of each CU is signaled by the split_tu_flag syntax described in NPL 2.

The estimator 1025 determines a split_cu_flag syntax value for determining a CU partitioning shape to minimize the coding cost for each CTU. The estimator 1025 determines a pred_mode_flag syntax value for determining intra prediction/inter prediction, a part_mode syntax value for determining a PU partitioning shape, and a split_tu_flag syntax value for determining a TU partitioning shape to minimize the coding cost for each CU. The estimator 1025 determines an intra prediction direction, a motion vector, and the like to minimize the coding cost for each PU.

NPL 3 discloses a decision method for the split_cu_flag syntax value, the pred_mode_flag syntax value, the part_mode syntax value, the split_tu_flag syntax value, the intra prediction direction, the motion vector, and the like to minimize a coding cost J based on the Lagrange multiplier λ.

Referring to 4.8.3 Intra/Inter/PCM mode decision in NPL 3, a decision process for the split_cu_flag syntax value, the pred_mode_flag syntax value, and the part_mode syntax value will be described in brief below.

In this section, a CU mode decision process for determining the pred_mode_flag syntax value and the part_mode syntax value for a CU is disclosed. A process for a CU partitioning shape for determining the split_cu_flag syntax value by recursively executing the CU mode decision process is also disclosed.

First, the CU mode decision process will be described. A set of PU partitioning shape candidates for inter prediction is denoted as InterCandidate, a set of PU partitioning shape candidates for intra prediction is denoted as IntraCandidate, and SSE (Sum of Square Error) coding cost $J_{SSE}$(mode) for a certain encoding mode (mode) is defined as follows:

InterCandidate={INTER_2N×2N,INTER_2N×N,INTER_N×2N,INTER_2N×N,INTER_N×2N,
INTER_2N×nU,INTER_2N×nD,INTER_nL×2N,
INTER_nR×2N,INTER_N×N}

IntraCandidate={INTRA_2N×2N,INTRA_N×N}

$J_{SSE}$(mode)=$D_{SSE}$(mode)+$\lambda_{mode}$·$R_{mode}$(mode)

[Math. 1]

$$\lambda_{mode} = 2^{\frac{QP-12}{3}}$$

Note that $D_{SSE}$(mode), $R_{mode}$(mode), and QP denote SSE with a reconstructed image signal obtained by encoding using a CU input image signal and mode, the number of bits of a CU (including the number of bits of a quantized transform value to be described later) generated upon encoding using mode, and a quantization parameter, respectively.

In the CU mode decision process, bestPUmode as a combination of pred_mode_flag syntax and part_mode syntax to minimize SSE coding cost $J_{SSE}$(mode) is selected from InterCandidate and IntraCandidate. As a formula, the CU mode decision process can be defined as follows:

[Math. 2]

$$bestPUmode = \arg\min_{PUmode \in PUCandidate} \{J_{SSE}(PUmode)\}$$

PUCandidate={InterCandidate,IntraCandidate}

Next, the decision process for a CU partitioning shape will be described.

As shown in FIG. 15, the SSE coding cost of a CU (hereinafter called a node) having a certain CUDepth is the SSE coding cost of the bestPUmode of the node. In other words, the SSE coding cost $J_{SSE}$(node, CUDepth) of a node can be defined as follows:

[Math. 3]

$$J_{SSE}(node, CUDepth) = \min_{PUmode \in PUCandidate} \{J_{SSE}(PUmode)\}$$

The SSE coding cost of the i-th child CU (hereinafter called a child node or a leaf) of the CU having CUDepth, where 1≤i≤4, is the SSE coding cost of the i-th CU having CUDepth+1. In other words, the SSE coding cost $J_{SSE}$(leaf (i), CUDepth) of the i-th leaf can be defined as follows:

$J_{SSE}$(leaf(i),CUDepth)=$J_{SSE}$(node,CUDepth+1)

It can be compared whether the SSE coding cost of a node is higher than the sum of the SSE coding costs of leaves thereof to determine whether to divide the CU into four child CUs. When $J_{SSE}$(node, CUDepth) is larger than the value of the following expression (1), the CU is divided into four child CUs (split_cu_flag=1 is determined). When $J_{SSE}$(node, CUDepth) is smaller than or equal to the value of the expression (1), the CU is not divided into four child CUs (split_cu_flag=0 is determined).

[Math. 4]

$$\sum_{i=1}^{4} J_{SSE}(\text{leaf}(i), CUDepth) \qquad (1)$$

A decision process for a CU quadtree structure recursively makes the above-mentioned comparison for each CUDepth to determine the quadtree structure of a CTU. In other words, split_cu_flag of a leaf is determined for each CUDepth.

The estimator 1025 minimizes the coding cost J based on the Lagrange multiplier λ to determine split_tu_flag, the intra prediction direction, the motion vector, and the like in the same manner.

Based on the split_cu_flag syntax value, the pred_mode_flag syntax value, the part_mode syntax value, the split_tu_flag syntax value, the intra prediction direction, the motion vector, and the like determined by the estimator 1025, the predictor 1024 generates a prediction signal for an input image signal of each CU. The prediction signal is generated based on intra prediction or inter-frame prediction mentioned above.

The transformer/quantizer 1021 frequency-transforms a prediction error image obtained by subtracting the prediction signal from the input image signal, based on the TU partitioning shape determined by the estimator 1025.

The transformer/quantizer 1021 further quantizes the frequency-transformed prediction error image (frequency transform coefficient). The quantized frequency transform coefficient is hereafter referred to as "transform quantization value".

The entropy encoder 1056 entropy-encodes difference information on the split_cu_flag syntax value, the pred_mode_flag syntax value, the part_mode syntax value, the split_tu_flag syntax value, and the intra prediction direction determined by the estimator 1025, difference information on the motion vector, and the quantized transform value.

The inverse quantizer/inverse transformer 1022 inverse-quantizes the transform quantization value. The inverse quantizer/inverse transformer 1022 further inverse-frequency-transforms the frequency transform coefficient obtained by the inverse quantization. The prediction signal is added to the reconstructed prediction error image obtained by the inverse frequency transform, and the result is supplied to the buffer 1023. The buffer 1023 stores the reconstructed image.

The typical video encoding device generates a bitstream based on the operation described above.

In the video encoding device depicted in FIG. 13, the load of all of the video encoding process for determining the split_cu_flag syntax value, the pred_mode_flag syntax value, the part_mode syntax value, the split_tu_flag syntax value, the intra prediction direction, the motion vector, etc. is concentrated at the specific estimator.

CITATION LIST

Patent Literature

PTL 1: Japanese Patent Application Publication No. 2012-104940

Non Patent Literatures

NPL 1: ITU-T H.264 2011/06
NPL 2: ITU-T recommendation H.265 High efficiency video coding, April 2013
NPL 3: High efficiency video coding (HEVC) text specification draft 7 of ITU-T SG16 WP3 and ISO/IEC JTC1/SC29/WG11 12th Meeting: Geneva, C H, 27 Apr.-7 May 2012

SUMMARY OF THE INVENTION

Some of the inventors of the present invention proposed a video encoding device capable of distributing the processing load (Japanese Patent Application No. 2013-185994).

Note that a video encoding device including a first encoding part and a second encoding part is described in PTL 1. However, a technique for distributing load in the video encoding device is not disclosed in PTL 1.

FIG. 18 is a block diagram showing an example of a video encoding device capable of distributing processing load. In the video encoding device shown in FIG. 18, the first video encoder 102 is an AVC (Advanced Video Coding) video encoder that supports macroblocks equivalent to CTUs of the 16×16 pixel LCU size. The first video encoder 102 is a video encoder based on the H.264/AVC standard described in NPL 1. A second video encoder 105 is an HEVC video encoder that supports 32×32 pixel and 64×64 pixel CTUs as well as 16×16 pixels. In other words, the second video encoder 105 is a video encoder based on the H.265/HEVC standard. In other words, the maximum LCU size that can be supported by the first video encoder 102 is smaller than or equal to the maximum LCU size that can be supported by the second video encoder 105.

The video encoding device shown in FIG. 18 includes a size extender 101, the first video encoder 102, a buffer 103, a coded data transcoder 1040, and the second video encoder 105.

The size extender 101 extends the width, src_pic_width, and the height, src_pic_height, of an input image src to multiples of 16. For example, in the case of (src_pic_width, src_pic_height)=(1920, 1080), the extended width, e_src_pic_width, and height, e_src_pic_height, of the input image become (e_src_pic_width, e_src_pic_height)=(1920, 1088). Note that a pixel value of an area the size of which is extended may be a copy of the pixel value of a boundary with the input image, or may be a predefined pixel value (e.g., 128 indicating a gray color).

The size extender 101 supplies the size-extended input image to the first video encoder 102 and the buffer 103. The first video encoder 102 encodes the size-extended input image in the H.264/AVC system.

The configuration and operation of the first video encoder 102 will be described.

The first video encoder 102 includes a transformer/quantizer 1021, an inverse quantizer/inverse transformer 1022, a buffer 1023, a predictor 1024, and an estimator (first estimator) 1025.

The estimator 1025 determines AVC coded data of each macroblock constituting the size-extended input image, using the size-extended input image and a reconstructed image stored in the buffer 1023. In this specification, AVC coded data (AVCMB) includes coded data (mb_type, sub_mb_type, ref_idx_l0, ref_idx_l1, mv_l0, mv_l1, intra_lumaN×N_pred, transform_size_8×8 flag) other than a DCT coefficient of a 16×16 pixel area corresponding to a macroblock, as depicted in FIG. 23. Here, mb_type and sub_mb_type respectively indicate a coding mode of a macroblock defined in Table 7-11, Table 7-13, and Table 7-14 in NPL 3 and a coding mode of a sub-macroblock defined in Table 7-17 and Table 7-18 in NPL 3. Moreover, ref_idx_lx (x=0/1), mv_lx, intra_lumaN×N_pred, and transform_size_8×8 flag respectively indicate a reference picture index of a reference picture list x, a motion vector of the reference picture list x, a luminance intra prediction direction, and a flag of whether or not the macroblock is encoded using 8×8 DCT.

Given that the macroblock is 16×16 pixels as mentioned above and the smallest processing unit in AVC is 4×4 pixels, the position of each piece of AVC coded data in each macroblock is defined by a combination of a 16×16 block address b8 ($0 \leq b8 \leq 3$) in the macroblock (the upper part in FIG. 24) and a block address b4 ($0 \leq b4 \leq 3$) in the 8×8 block (the lower part in FIG. 24). For example, intra_lumaN×N_pred at the position (x, y)=(4, 4) in the macroblock corresponds to (b8, b4)=(0, 1), and can be stored in intra_lumaN×N_pred[0][3].

The estimator 1025 outputs the determined AVC coded data of each macroblock to the predictor 1024 and the coded data transcoder 1040.

The predictor 1024 generates a prediction signal corresponding to the size-extended input image signal of each macroblock, based on the mb_type syntax value, the sub_mb_type syntax value, the ref_idx_l0 syntax value, the ref_idx_l1 syntax value, the mv_l0 syntax value, the mv_l1 syntax value, and the intra_lumaN×N_pred syntax value determined by the estimator 1025. The prediction signal is generated based on the above-mentioned intra prediction or inter-frame prediction.

Regarding intra prediction in H.264/AVC, intra prediction modes of three block sizes, i.e. Intra_4×4, Intra_8×8, and Intra_16×16, defined by mb_type are available, as described in NPL 1.

Intra_4×4 and Intra_8×8 are respectively intra prediction of 4×4 block size and 8×8 block size, as can be understood from (a) and (c) in FIG. 21. Each circle (o) in the drawing represents a reference pixel for intra prediction, i.e. the reconstructed image stored in the buffer 1023.

In intra prediction of Intra_4×4, peripheral pixels of the reconstructed image are directly set as reference pixels, and used for padding (extrapolation) in nine directions depicted in (b) in FIG. 21 to form the prediction signal. In intra prediction of Intra_8×8, pixels obtained by smoothing peripheral pixels of the reconstructed image by low-pass filters (½, ¼, ½) depicted directly below the right arrow in (c) in FIG. 21 are set as reference signals, and used for extrapolation in the nine directions depicted in (b) in FIG. 21 to form the prediction signal. In (b) of FIG. 21, the arrows indicate reference directions (opposite to the prediction directions). In (b) of FIG. 21, the numerals indicate prediction mode numbers.

Intra_16×16 is intra prediction of 16×16 block size, as can be understood from (a) in FIG. 22. Each circle (○) in FIG. 22 represents a reference pixel for intra prediction, i.e. the reconstructed image stored in the buffer 1023, as in the example depicted in FIG. 21. In intra prediction of Intra_16× 16, peripheral pixels of the reconstructed image are directly set as reference pixels, and used for extrapolation in four directions depicted in (b) in FIG. 22 to form the prediction signal.

Regarding inter-frame prediction in H.264/AVC, 16×16, 16×8, 8×16, and Tree prediction shapes defined by mb_type are available, as depicted in FIG. 23. In the case where the macroblock is Tree, each 8×8 sub-macroblock has a prediction shape of any of 8×8, 8×4, 4×8, and 4×4 defined by sub_mb_type. It is assumed in this specification that, in the case where mb_type is Tree (P_8×8 or B_8×8), each 8×8 sub-macroblock is limited only to 8×8, for simplicity's sake.

The transformer/quantizer 1021 frequency-transforms a prediction error image obtained by subtracting the prediction signal from the size-extended input image signal, based on the mb_type syntax value and the transform_size_8×8_flag syntax value determined by the estimator 1025.

The transformer/quantizer 1021 further quantizes the frequency-transformed prediction error image (frequency transform coefficient). The quantized frequency transform coefficient is hereafter referred to as "transform quantization value".

The inverse quantizer/inverse transformer 1022 inverse-quantizes the transform quantization value. The inverse quantizer/inverse transformer 1022 further inverse-frequency-transforms the frequency transform coefficient obtained by the inverse quantization. The prediction signal is added to the reconstructed prediction error image obtained by the inverse frequency transform, and the result is supplied to the buffer 1023. The buffer 1023 stores the reconstructed image.

Based on the above-mentioned operation, the first video encoder 102 encodes the size-extended input image signal.

The coded data transcoder 1040 transcodes the AVCMB of each macroblock to an HEVCCB which is HEVC coded data (cu_size, tu_size, pred_mode_flag, part_mode, ref_idx_l0, ref_idx_l1, mv_l0, mv_l1, intra_lumaN× N_pred, intra_chroma_pred) of a 16×16 pixel area corresponding to the macroblock, as depicted in FIG. 24. Here, cu_size and tu_size respectively indicate CU size and TU size.

FIG. 25 is an explanatory diagram showing the rules of transcoding from AVC coded data of macroblocks in I_SLICE to HEVCCB. FIG. 26 is an explanatory diagram showing the rules of transcoding from AVC coded data of macroblocks in P_SLICE to HEVCCB. FIG. 27 is an explanatory diagram showing the rules of transcoding from AVC coded data of macroblocks in B_SLICE to HEVCCB. In FIG. 25 to FIG. 27, V denotes the vertical direction and H denotes the horizontal direction. Further, each row shows a transcoding rule between respective items of mb_type and intra_lumaN×N_pred.

Given that the smallest LCU size is 16×16 pixels, the smallest SCU size is 8×8 pixels, and the smallest processing unit is 4×4 pixels in HEVC, HEVC coded data can be managed in units of 16×16 pixels. The position of HEVC coded data in 16×16 pixels can be defined by a combination of a 8×8 block address b8 (0≤b8≤3) in the macroblock and a block address b4 (0≤b4≤3) in the 8×8 block, as with AVC coded data.

For example, in the case where the CU size is 16, cu_size[b8] (0≤b8≤3) of HEVC coded data in 16×16 pixels are all 16.

I_SLICE mapping depicted in FIG. 25, P_SLICE mapping depicted in FIG. 26, and B_SLICE mapping depicted in FIG. 27 each indicate rules for mapping (transcoding) AVC-MBs to HEVCCBs by the coded data transcoder 1040, depending on picture type.

Next, in the case where part_mode of all adjacent four HEVCCBs depicted in FIG. 28 are 2N×2N and all of the HEVCCBs have the same cu_size, pred_mode_flag, and motion information (ref_idx_l0, ref_idx_l1, mv_l0, and mv_l1), the coded data transcoder 1040 merges the four HEVCCBs. In detail, the coded data transcoder 1040 updates cu_size of the four HEVCCBs to 32.

Further, in the case where part_mode of all adjacent 16 HEVCCBs depicted in FIG. 29 are 2N×2N and all of the HEVCCBs have the same cu_size, pred_mode_flag, and motion information (ref_idx_l0, ref_idx_l1, mv_l0, and mv_l1), the coded data transcoder 1040 merges the 16 HEVCCBs. In detail, the coded data transcoder 1040 updates cu_size of the 16 HEVCCBs to 64.

The second video encoder 105 encodes, according to HEVC, the size-extended input image supplied from the buffer 103 based on the HEVC coded data supplied from the coded data transcoder 1040, and outputs a bitstream. The second video encoder 105 sets the input image src not to a multiple of the SCU but to a multiple of the macroblock size of the first video encoder 102, in order to enhance the reliability of the coded data of the first video encoder 102 for image boundaries.

The following describes the structure and operation of the second video encoder 105.

The second video encoder 105 includes a transformer/quantizer 1051, an inverse quantizer/inverse transformer 1052, a buffer 1053, a predictor 1054, an estimator (second estimator) 1055, and an entropy encoder 1056.

The estimator 1055 in the second video encoder 105 can determine split_cu_flag for each CTU, according to cu_size of the HEVC coded data. For example, in the case where cu_size=64, split_cu_flag at CUDepth=0 is set to 0. Likewise, the estimator 1055 can determine the intra prediction/inter prediction and PU partitioning shape of each CU, according to pred_mode_flag and part_mode of the HEVC coded data. The estimator 1055 can also determine the intra prediction direction, motion vector, etc. of each PU, according to pred_mode_flag and part_mode of the HEVC coded data. Thus, the estimator 1055 does not need to exhaustively search for the coding parameters that minimize the coding cost J based on the Lagrange multiplier λ, unlike the estimator in the background art.

The predictor 1054 generates a prediction signal corresponding to the input image signal of each CU, based on the split_cu_flag syntax value, the pred_mode_flag syntax value, the part_mode syntax value, the split_tu_flag syntax value, the intra prediction direction, the motion vector, etc. determined by the estimator 1055. The prediction signal is generated based on the above-mentioned intra prediction or inter-frame prediction.

The transformer/quantizer 1051 frequency-transforms a prediction error image obtained by subtracting the prediction signal from the input image signal, based on the TU partitioning shape determined by the estimator 1055 according to tu_size of the HEVC coded data.

The transformer/quantizer 1051 further quantizes the frequency-transformed prediction error image (frequency transform coefficient).

The entropy encoder 1056 entropy-encodes the split_cu_flag syntax value, the pred_mode_flag syntax value, the part_mode syntax value, the split_tu_flag syntax value, the difference information of the intra prediction direction, and the difference information of the motion vector determined by the estimator 1055, and the transform quantization value.

The inverse quantizer/inverse transformer 1052 inverse-quantizes the transform quantization value. The inverse quantizer/inverse transformer 1052 further inverse-frequency-transforms the frequency transform coefficient obtained by the inverse quantization. The prediction signal is added to the reconstructed prediction error image obtained by the inverse frequency transform, and the result is supplied to the buffer 1053. The buffer 1053 stores the reconstructed image.

Based on the operation described above, the second video encoder 105 encodes, according to HEVC, the size-extended input image supplied from the buffer 103 based on the HEVC coded data supplied from the coded data transcoder 1040, and outputs a bitstream.

The following describes the operation of the video encoding device with reference to a flowchart in FIG. 30.

In step S101, the size extender 101 extends the size of an input image to a multiple of 16 as the macroblock size of the first video encoder 102.

In step S102, the first video encoder 102 encodes the size-extended input image in the AVC system.

In step S103, the coded data transcoder 1040 transcodes the AVCMB of each macroblock of the size-extended input image to the HEVCCB, and further merges HEVCCBs.

In step S104, the second video encoder 105 encodes, according to HEVC, the size-extended input image supplied from the buffer 103 based on the HEVC coded data supplied from the coded data transcoder 1040, and outputs a bitstream.

In the video encoding device described above, the load of the video encoding process for determining the split_cu_flag syntax value, the pred_mode_flag syntax value, the part_mode syntax value, the split_tu_flag syntax value, the intra prediction direction, the motion vector, etc. is distributed between the first video encoder 102 and the second video encoder 105, thus reducing the concentration of the load of the video encoding process.

In the case where adjacent four HEVCCBs satisfy all of the following 32×32 2N×N conditions, the coded data transcoder 1040 may update cu_size and part_mode of the four HEVCCBs respectively to 32 and 2N×N.

[32×32 2N×N Conditions]
  part_mode of all HEVCCBs are 2N×2N.
  cu_size of all HEVCCBs are the same.
  pred_mode_flag of all HEVCCBs are 0.
  The motion information of all HEVCCBs are not the same.
  The motion information of upper two HEVCCBs are the same.
  The motion information of lower two HEVCCBs are the same.

In the case where adjacent four HEVCCBs satisfy all of the following 32×32 N×2N conditions, the coded data transcoder 104 may update cu_size and part_mode of the four HEVCCBs respectively to 32 and N×2N.

[32×32 N×2N Conditions]
  part_mode of all HEVCCBs are 2N×2N.
  cu_size of all HEVCCBs are the same.
  pred_mode_flag of all HEVCCBs are 0.
  The motion information of all HEVCCBs are not the same.
  The motion information of left two HEVCCBs are the same.
  The motion information of right two HEVCCBs are the same.

Further, in the case where adjacent 16 HEVCCBs satisfy all of the following 64×64 2N×N conditions, the coded data transcoder 1040 may update cu_size and part_mode of the 16 HEVCCBs respectively to 64 and 2N×N.

[64×64 2N×N Conditions]
  part_mode of all HEVCCBs are 2N×2N.
  cu_size of all HEVCCBs are the same.
  pred_mode_flag of all HEVCCBs are 0.
  The motion information of all HEVCCBs are not the same.
  The motion information of upper eight HEVCCBs are the same.
  The motion information of lower eight HEVCCBs are the same.

In the case where adjacent 16 HEVCCBs satisfy all of the following 64×64 N×2N conditions, the coded data transcoder 1040 may update cu_size and part_mode of the 16 HEVCCBs respectively to 64 and N×2N.

[64×64 N×2N Conditions]
  part_mode of all HEVCCBs are 2N×2N.
  cu_size of all HEVCCBs are the same.
  pred_mode_flag of all HEVCCBs are 0.
  The motion information of all HEVCCBs are not the same.
  The motion information of left eight HEVCCBs are the same.
  The motion information of right eight HEVCCBs are the same.

As shown in (b) of FIG. 21, there are a total of nine prediction modes, namely eight directional prediction modes and a DC prediction mode, as intra prediction modes in the H.264/AVC system. In the H.265/HEVC system, there are a total of 35 prediction modes, namely 33 directional prediction modes (see FIG. 11), the DC prediction mode, and a Planar prediction mode, as intra prediction modes. In the H.265/HEVC system, a coding system called Most probable mode (MPM) can be used. In MPM, the prediction direction, the DC prediction mode, or the Planar prediction mode of a PU adjacent to a PU to be processed is applied to the PU to be processed.

As described above, the coded data transcoder 1040 transcodes each AVCMB to HEVCCB according to a predetermined rule (see FIG. 25 to FIG. 27). As shown in FIG. 25 to FIG. 27, the coded data transcoder 1040 transcodes a prediction mode in the H.264/AVC system to a prediction mode in the H.265/HEVC system.

Since the number of prediction modes in the H.264/AVC system is smaller than the number of prediction modes in the H.265/HEVC system, the code compression efficiency (coding efficiency) of the second video encoder 105 could be reduced. For example, since Planar prediction frequently used in the H.264/AVC system is not available in the H.264/AVC system, the coded data transcoder 1040 does not transcode the prediction mode to Planar prediction. In FIG. 25 to FIG. 27, it is shown that, when Plane prediction (prediction mode 3) is performed in Intra_16×16 of the H.264/AVC system, the prediction mode is exceptionally transcoded to Planar prediction, but Planar prediction is not used in the other cases.

It is an object of the present invention to provide a video encoding device, a video encoding method, and a program capable of preventing a decrease in coding efficiency while distributing processing load.

A video encoding device according to the present invention includes: first video encoding means for encoding an input image to generate first coded data; coded data transcoding means for transcoding the first coded data generated by the first video encoding means to generate second coded data; and second video encoding means for generating a prediction signal based on the second coded data supplied from the coded data transcoding means, wherein the coded data transcoding means includes a prediction mode generating section for generating at least intra prediction modes unusable by the first video encoding means and usable by the second video encoding means, and a prediction mode selecting section for evaluating the prediction modes generated by the prediction mode generating section and, based on the evaluation results, selecting a prediction mode used by the second video encoding means.

A video encoding method according to the present invention includes: encoding an input image to generate first coded data; storing the input image in a buffer; transcoding the first coded data to generate second coded data; and generating a prediction signal based on the second coded data, wherein the method includes: generating at least intra prediction modes unusable to generate the first coded data and usable to generate the second coded data; and evaluating the generated prediction modes and, based on the evaluation results, selecting a prediction mode used to generate the second coded data.

A video encoding program according to the present invention causes a computer to execute: a process of encoding an input image to generate first coded data; a process of storing the input image in a buffer; a process of transcoding the first coded data to generate second coded data; and a process of generating a prediction signal based on the second coded data, wherein the program causes the computer to execute: a process of generating at least intra prediction modes unusable to generate the first coded data and usable to generate the second coded data; and a process of evaluating the generated prediction modes and, based on evaluation results, selecting a prediction mode used to generate the second coded data.

According to the present invention, a decrease in coding efficiency can be prevented while distributing processing load.

BRIEF DESCRIPTION OF THE DRAWINGS

FIG. 25 It depicts an explanatory diagram showing the rules of transcoding from AVC coded data of macroblocks in I_SLICE to HEVCCB.

FIG. 26 It depicts an explanatory diagram showing the rules of transcoding from AVC coded data of macroblocks in P_SLICE to HEVCCB.

FIG. 27 It depicts an explanatory diagram showing the rules of transcoding from AVC coded data of macroblocks in B_SLICE to HEVCCB.

DESCRIPTION OF THE PREFERRED EMBODIMENTS

Exemplary embodiments of the present invention will be described below with reference to the accompanying drawings.

First Exemplary Embodiment

Figure 1:
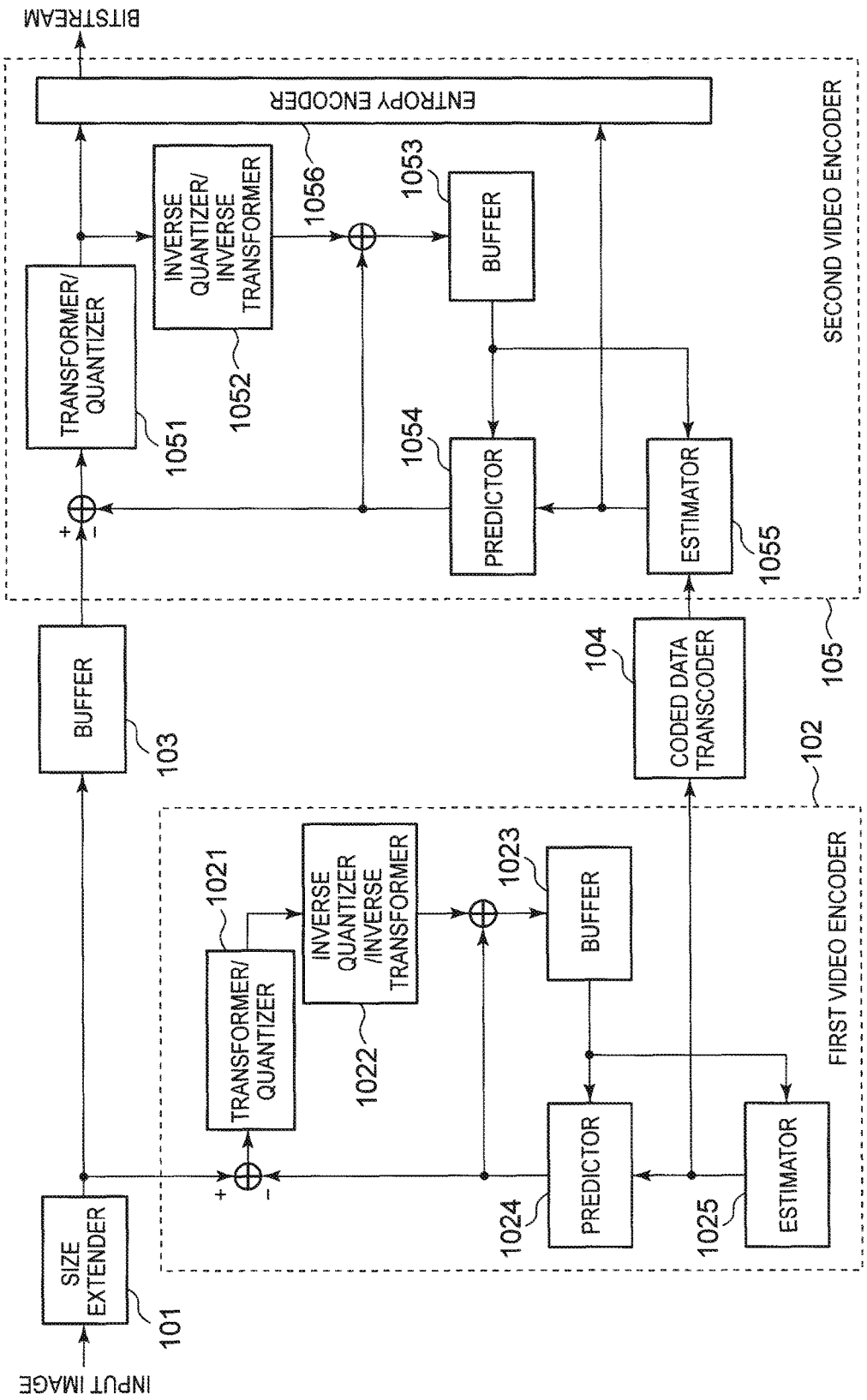
FIG. 1 It depicts a block diagram showing a configuration example of a video encoding device of one exemplary embodiment.

FIG. 1 is a block diagram showing a configuration example of a video encoding device of the embodiment. The video encoding device of the embodiment includes a size extender 101, a first video encoder 102, a buffer 103, a coded data transcoder 104, and a second video encoder 105. In the video encoding device shown in FIG. 1, the function of the coded data transcoder 104 is different from the function of the coded data transcoder 1040 shown in FIG. 18. The configuration of the other components of the video encoding device shown in FIG. 1 is the same as that of the video encoding device shown in FIG. 18.

Figure 2:
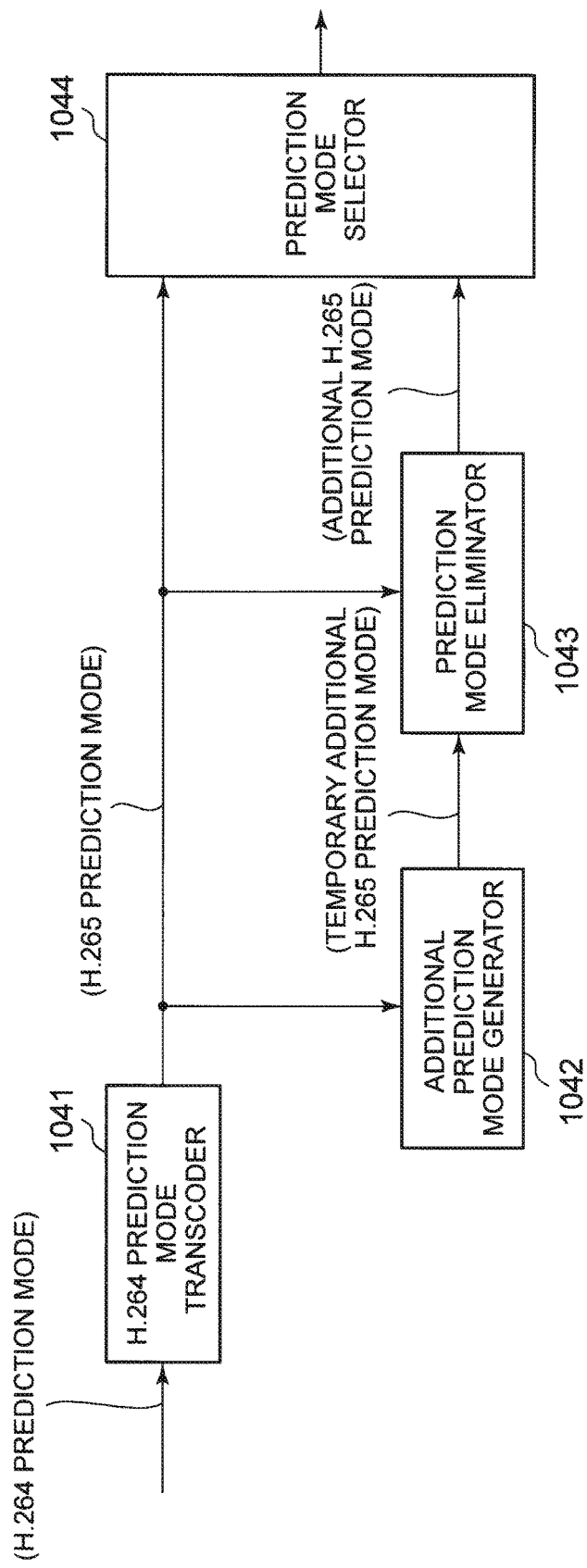
FIG. 2 It depicts a block diagram showing a configuration example of a coded data transcoder.

FIG. 2 is a block diagram showing a configuration example of the coded data transcoder 104. The coded data transcoder 104 includes an H.264 prediction mode transcoder 1041, an additional prediction mode generator 1042, a prediction mode eliminator 1043, and a prediction mode selector 1044.

Figure 18:
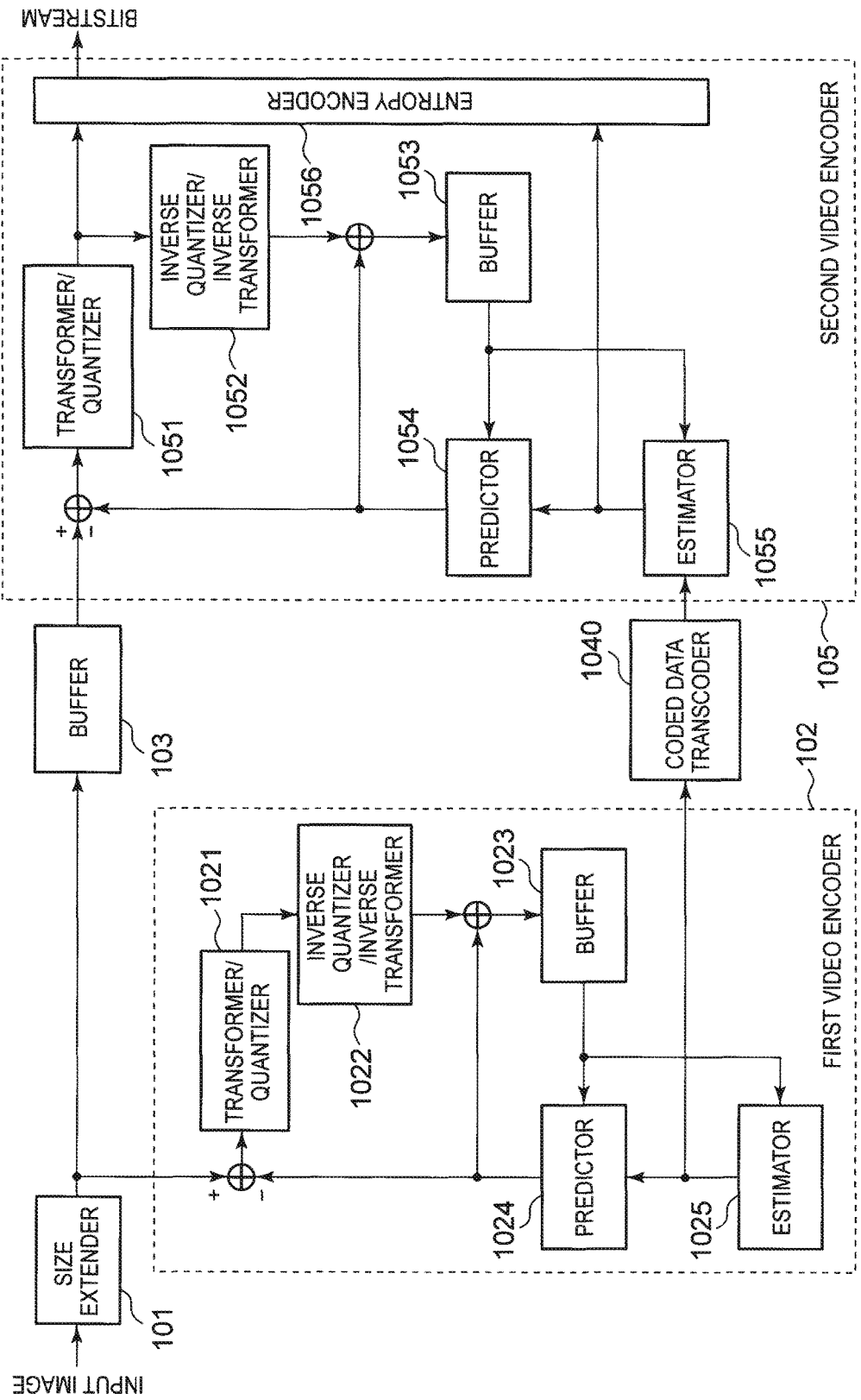
FIG. 18 It depicts a block diagram showing a configuration example of a video encoding device.
Figures 19, 20:
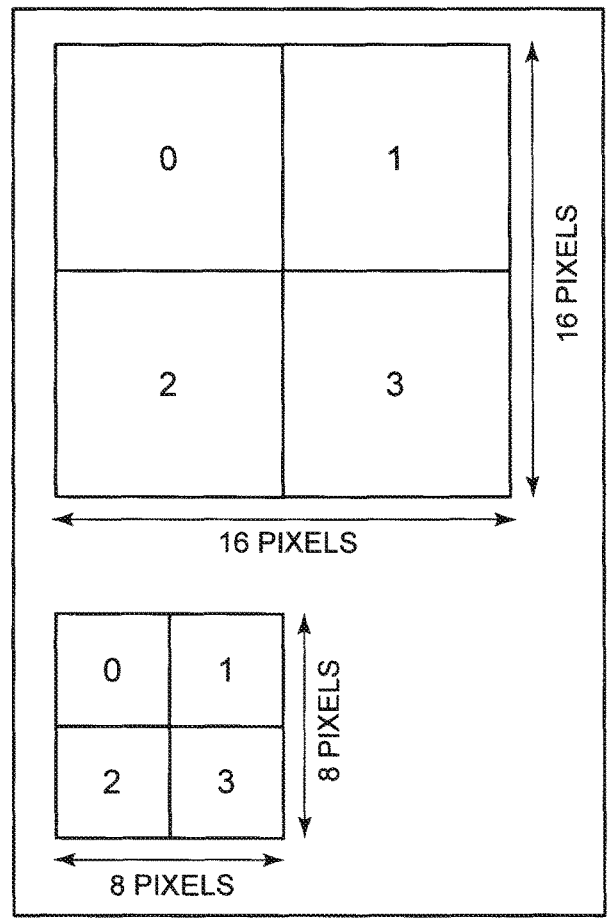
FIG. 19 It depicts an explanatory diagram showing AVC coded data.
FIG. 20 It depicts an explanatory diagram for describing block addresses in a macroblock.

The H.264 prediction mode transcoder 1041 has the same function as the coded data transcoder 1040 shown in FIG. 18. The additional prediction mode generator 1042 generates one or more prediction modes (intra prediction modes) usable by the second video encoder 105 as prediction modes added to the prediction modes transcoded by the H.264 prediction mode transcoder 1041. It will be specifically described later as to what prediction mode is generated. It is preferred that the additional prediction mode generator 1042 should generate at least an intra prediction mode unusable by the first video encoder 102 and usable by the second video encoder 105. Hereafter, the prediction mode transcoded by the H.264 prediction mode transcoder 1041 is called an H.265 prediction mode, and one or more prediction modes generated by the additional prediction mode generator 1042 are called temporary additional H.265 prediction modes.

The prediction mode eliminator 1043 eliminates a prediction mode that meets a predetermined condition among the temporary additional H.265 prediction modes. Hereafter, a set of prediction modes after the elimination processing by the prediction mode eliminator 1043 are called additional H.265 prediction modes. The prediction mode selector 1044 calculates coding costs on the H.265 prediction mode and the additional H.265 prediction modes to select a prediction mode with the minimum coding cost. The selected prediction mode is used by the transformer/quantizer 1051 in the second video encoder 105.

Figure 3:
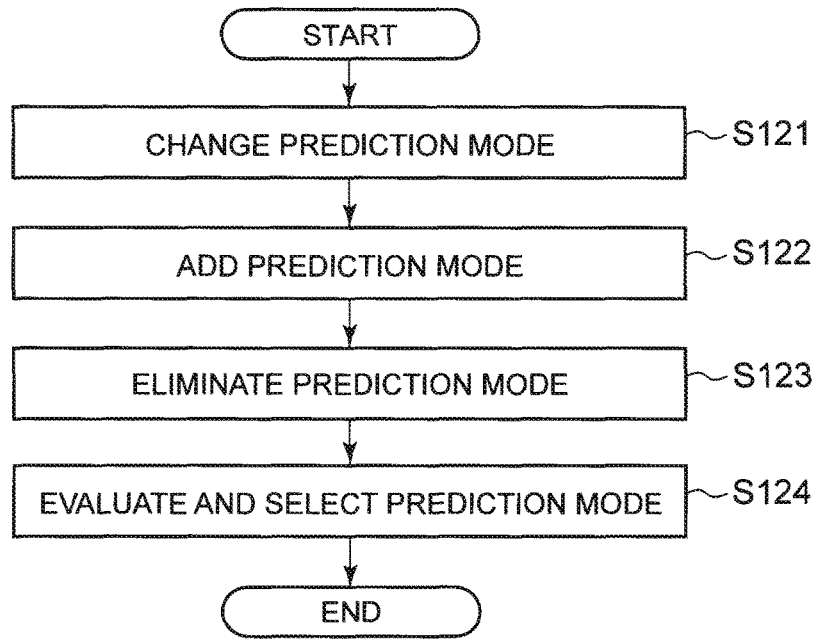
FIG. 3 It depicts a flowchart showing the operation of the video encoding device of the one exemplary embodiment.
Figure 4:
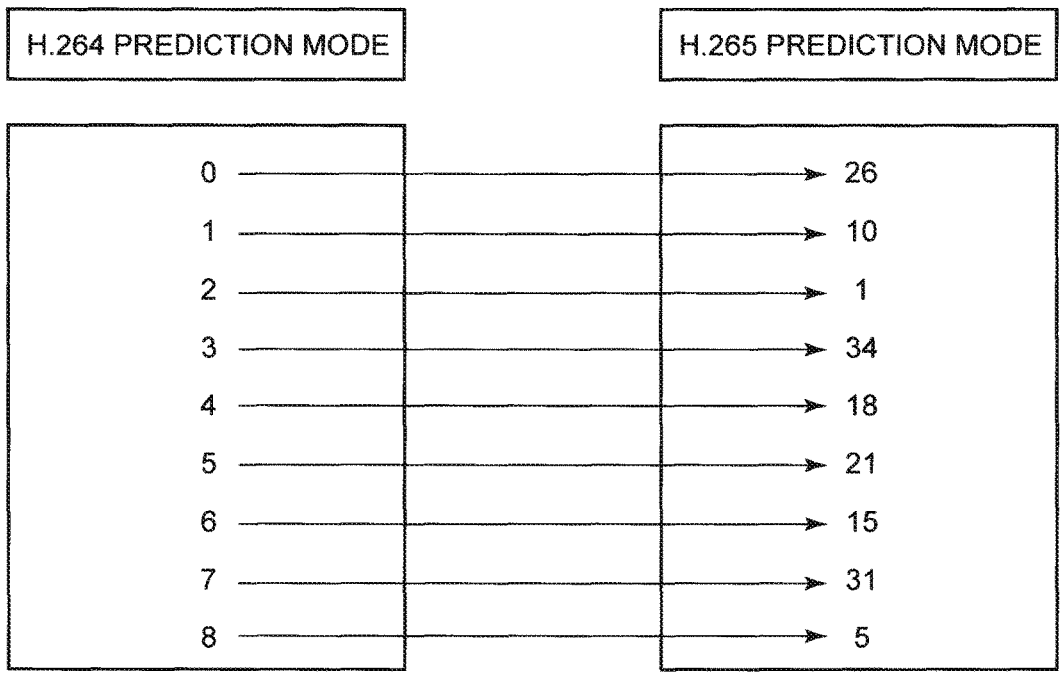
FIG. 4 It depicts an explanatory diagram for describing transcoding of prediction mode numbers.

Referring next to a flowchart of FIG. 3 and explanatory diagrams of FIG. 4 and FIG. 5, the operation of the coded data transcoder 104 will be described.

Figure 11:
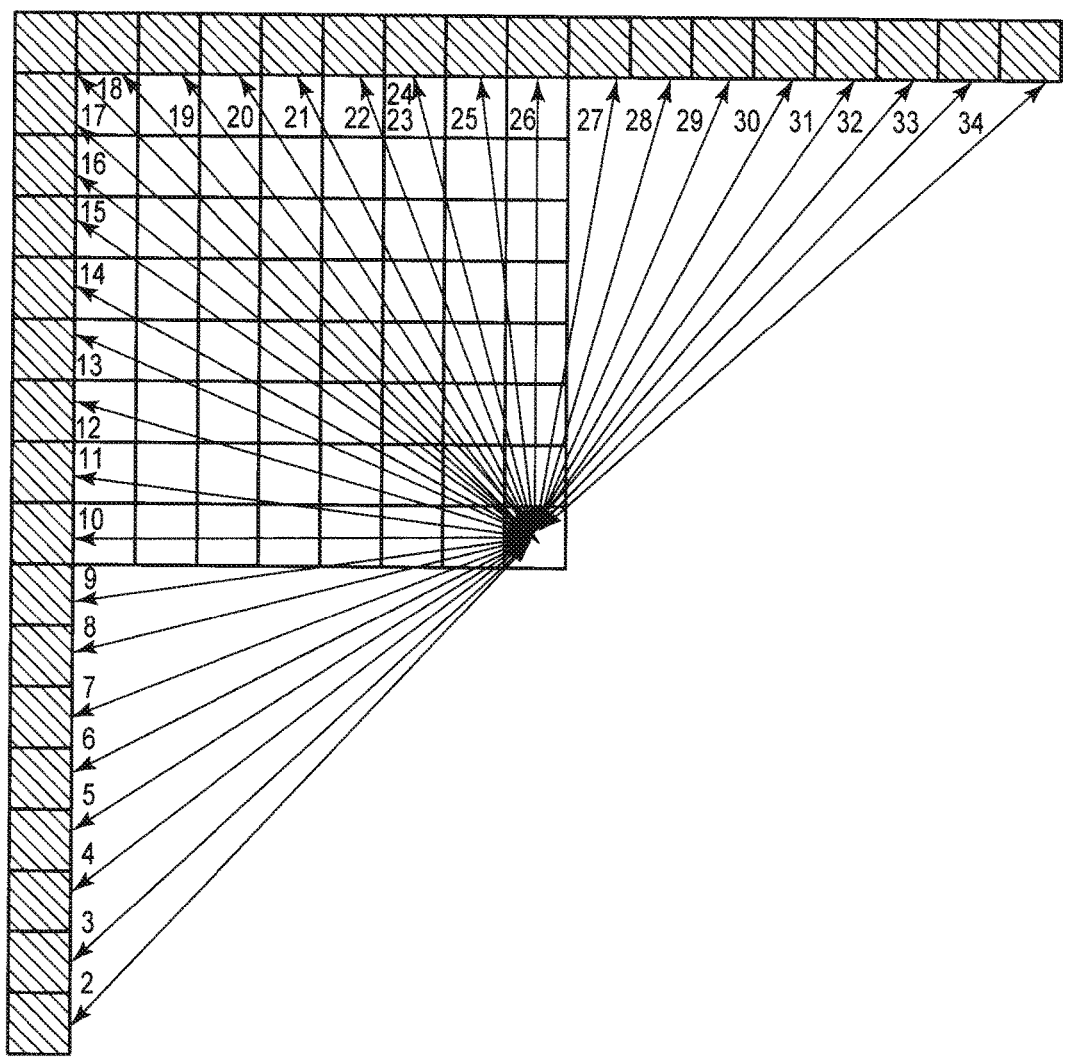
FIG. 11 It depicts an explanatory diagram showing an example of 33 angular intra prediction modes.
Figure 12:
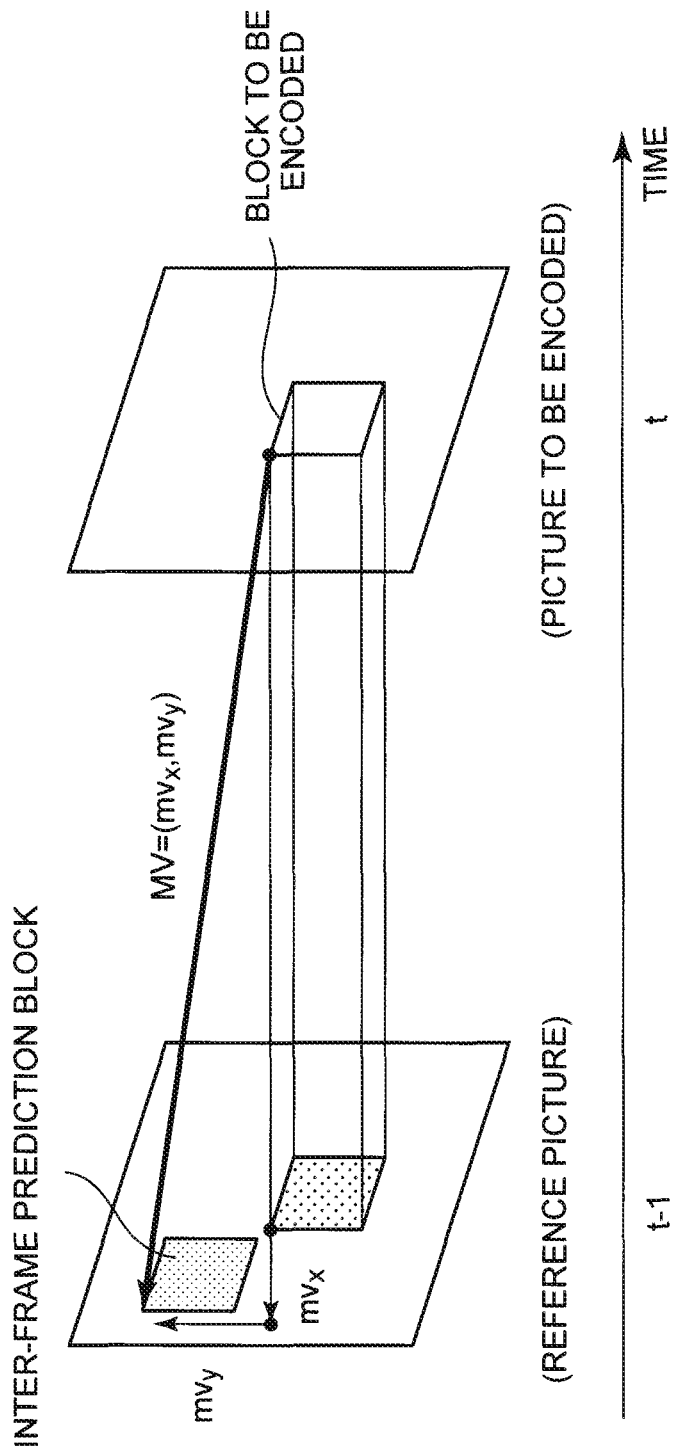
FIG. 12 It depicts an explanatory diagram showing an example of inter-frame prediction.
Figure 13:
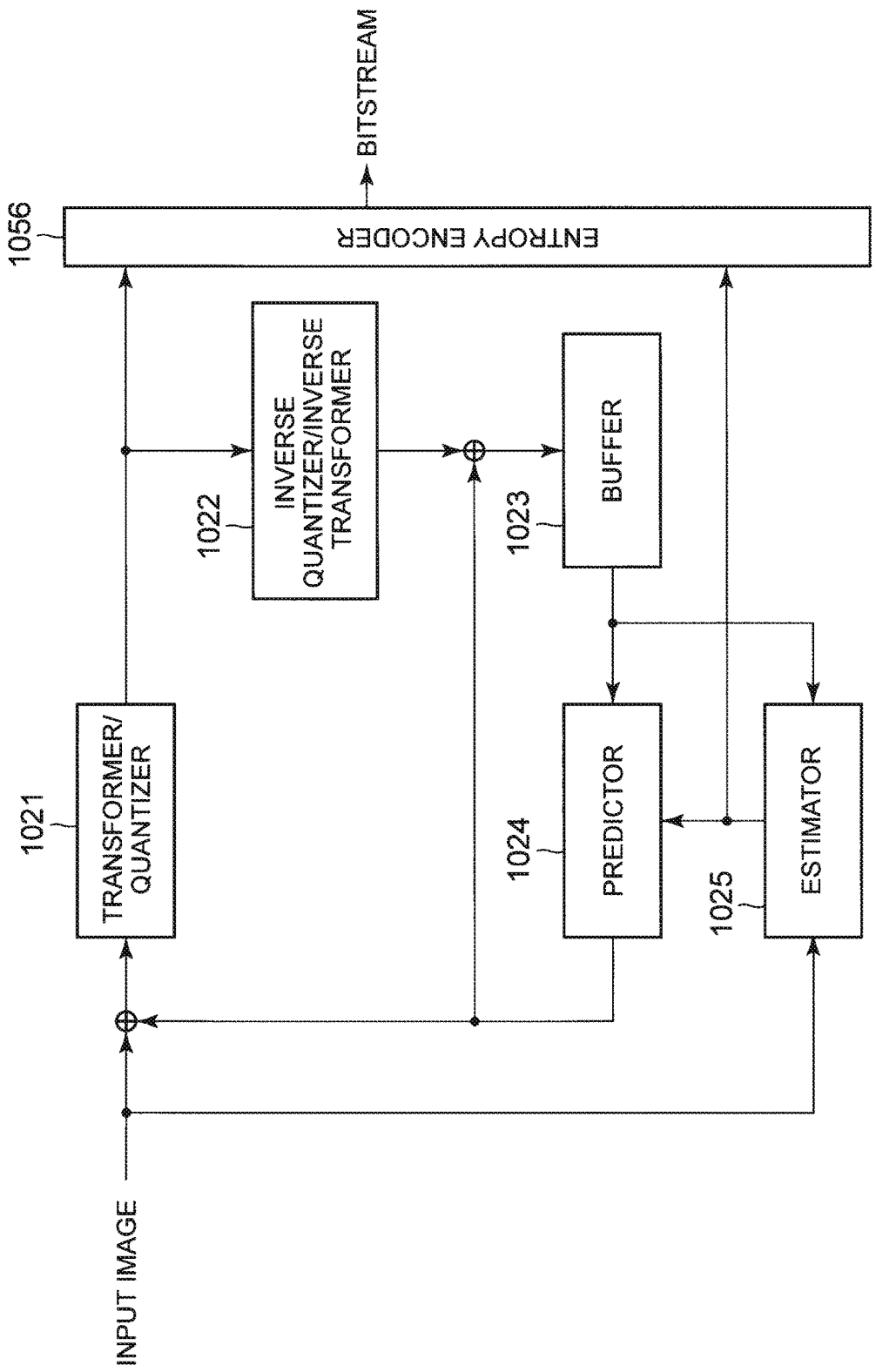
FIG. 13 It depicts a block diagram showing the configuration of a typical video encoding device.
Figure 14:
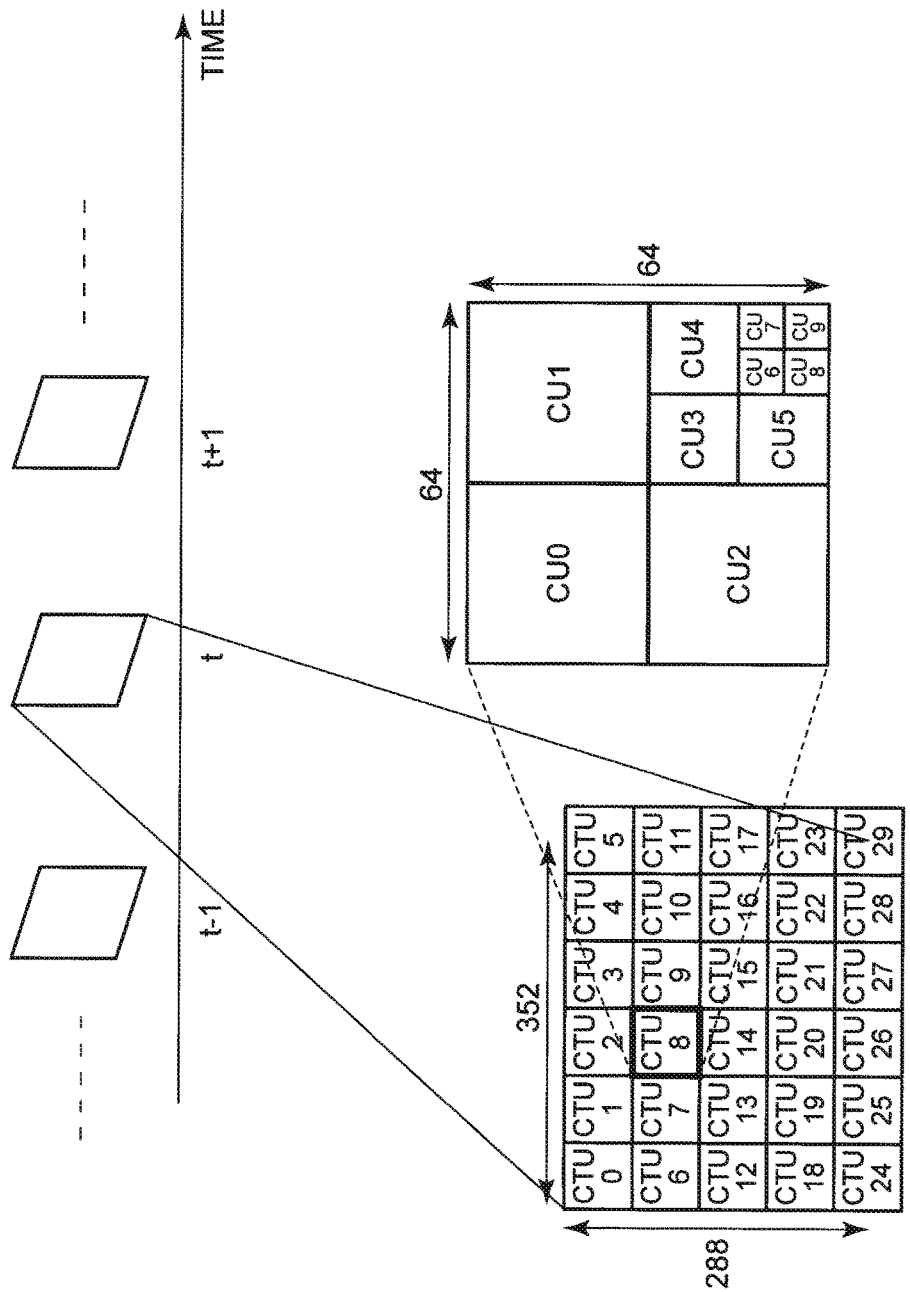
FIG. 14 It depicts an explanatory diagram showing an example of CTU division of a frame t and an example of CU division of CTU 8 in the frame t.
Figure 15:
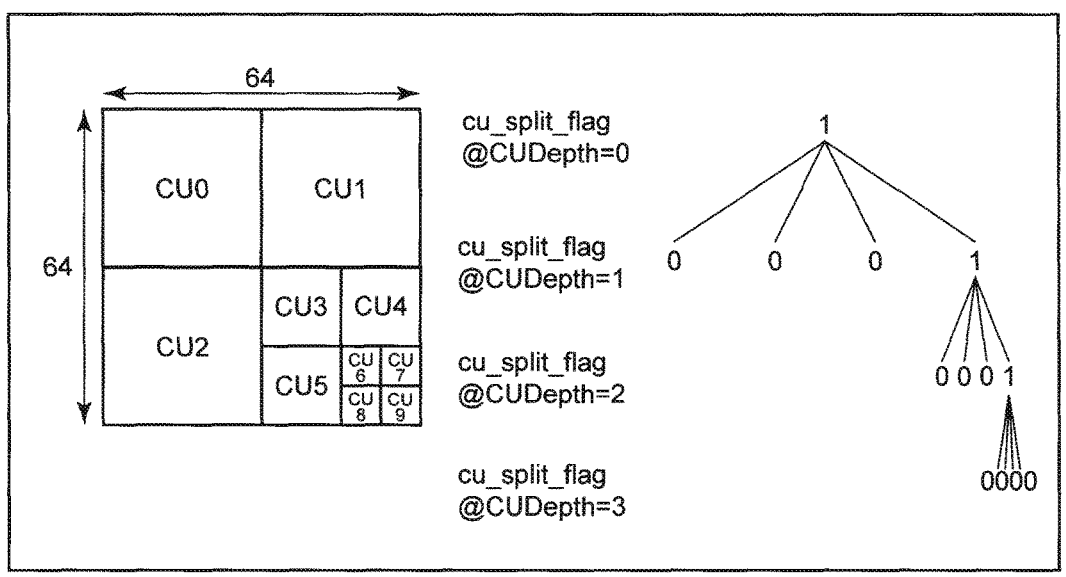
FIG. 15 It depicts an explanatory diagram showing a quadtree structure corresponding to the example of CU division of CTU 8.
Figure 16:
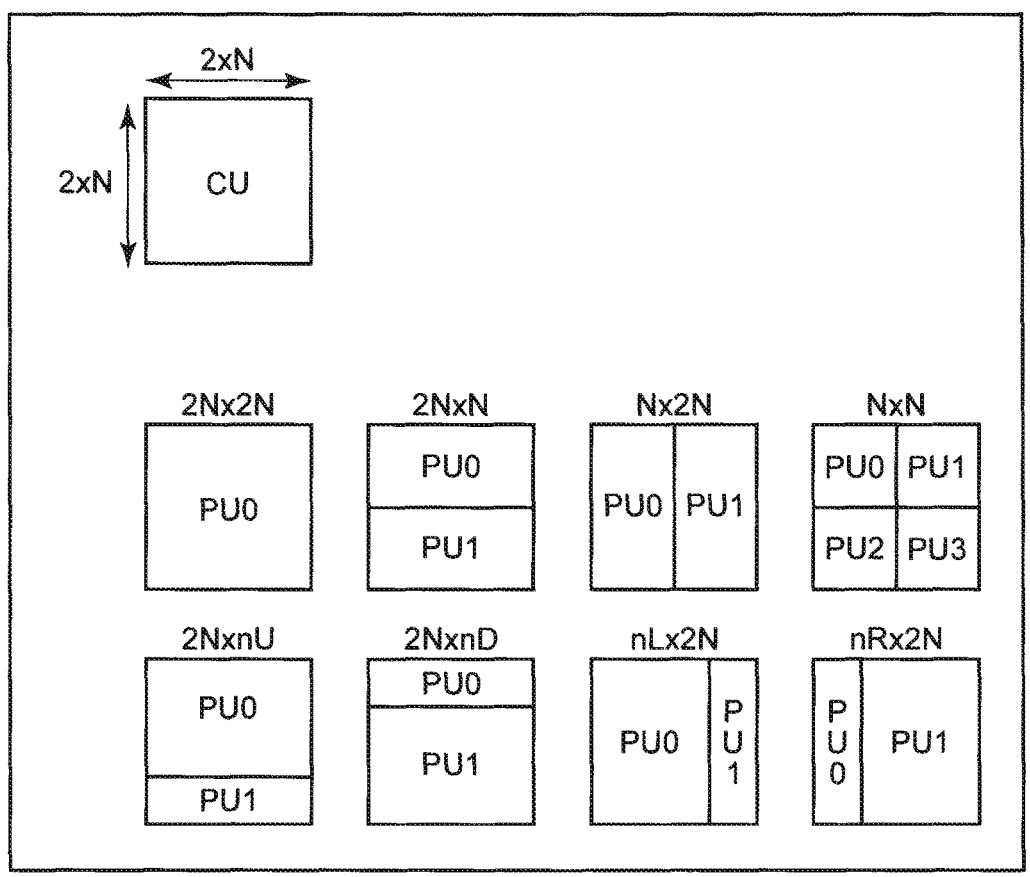
FIG. 16 It depicts an explanatory diagram showing examples of PU division of a CU.
Figure 17:
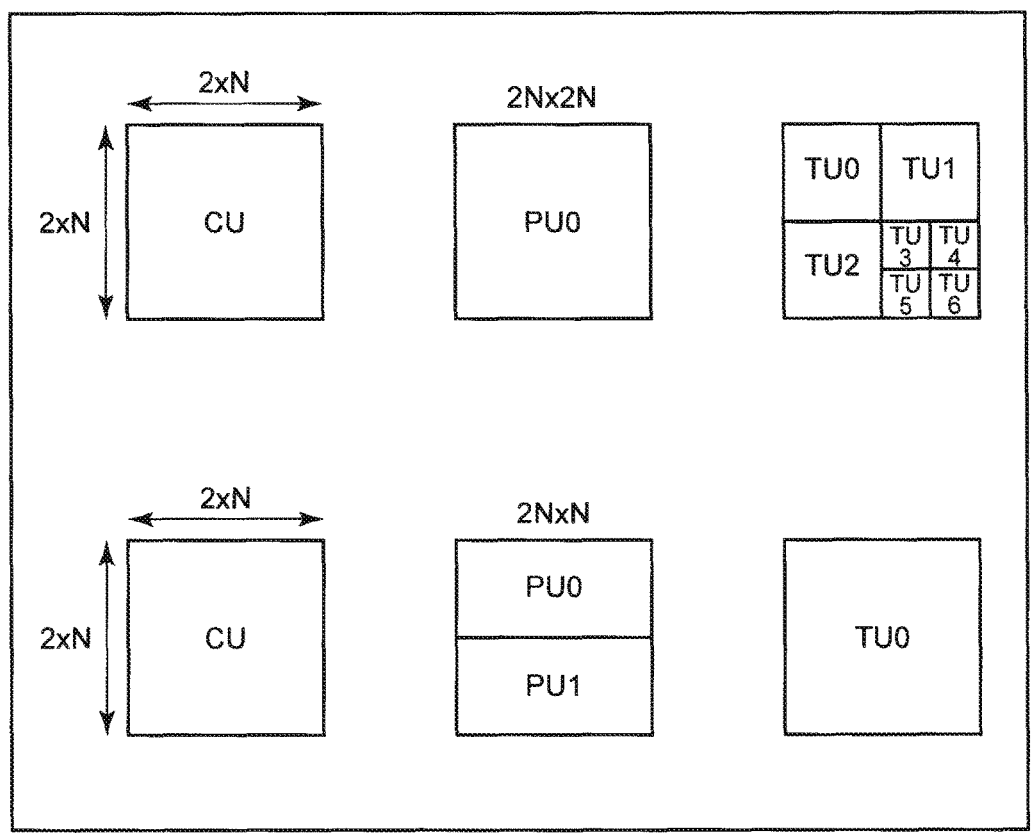
FIG. 17 It depicts an explanatory diagram showing examples of TU division of a CU.
Figure 21:
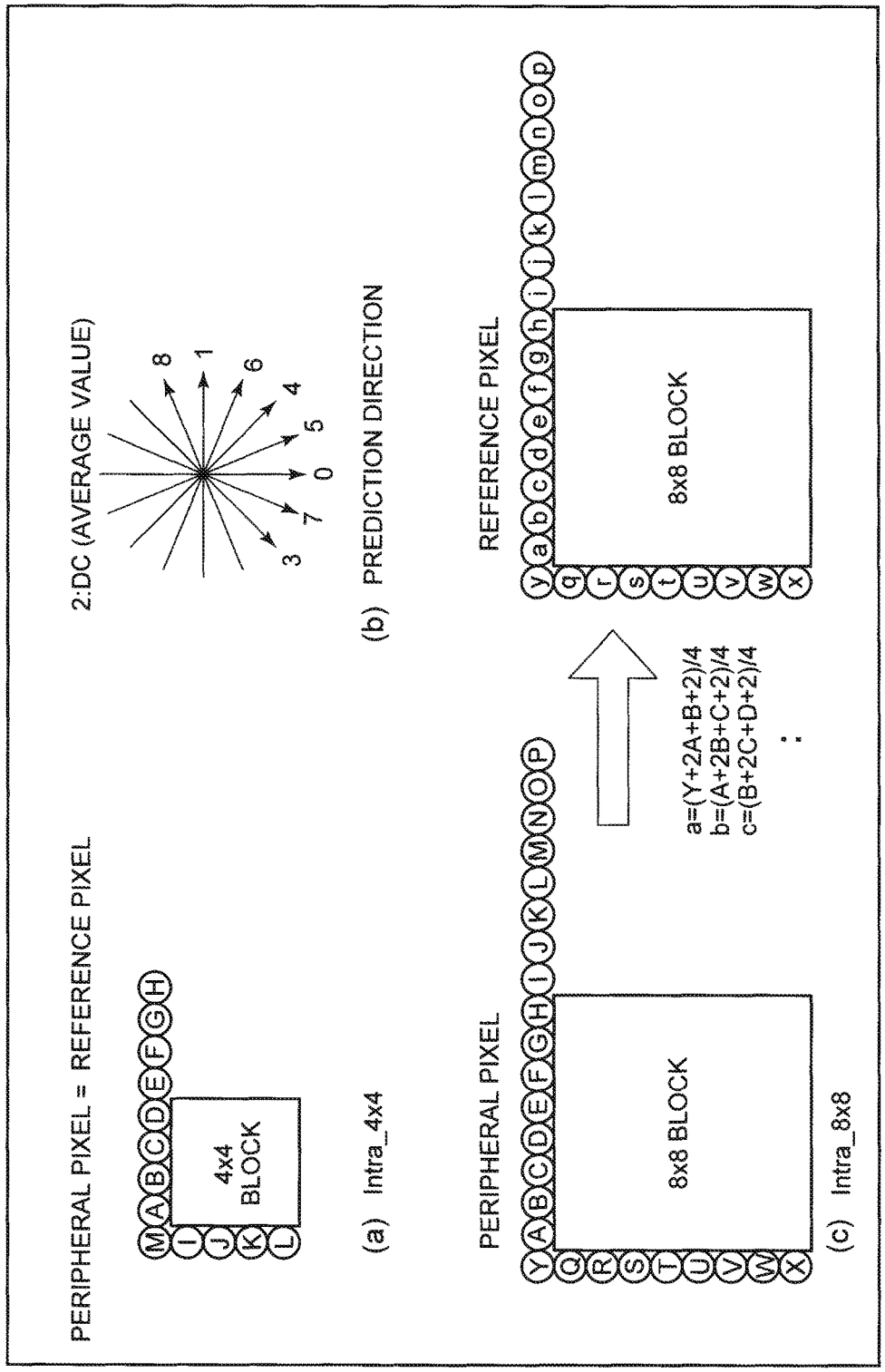
FIG. 21 It depicts an explanatory diagram for describing kinds of prediction.
Figure 22:
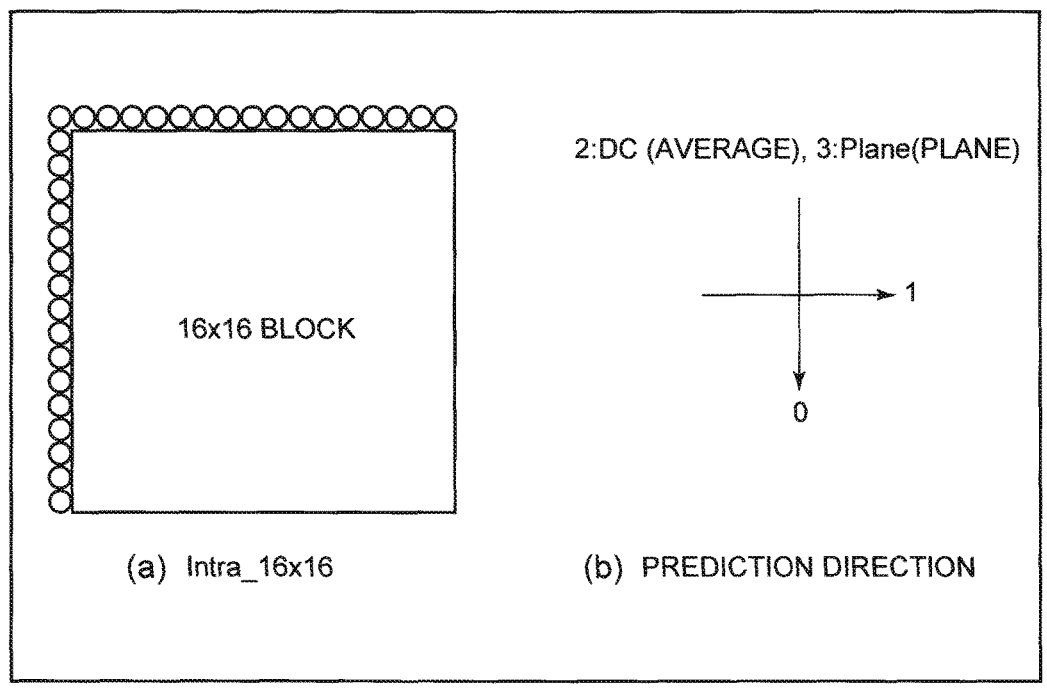
FIG. 22 It depicts an explanatory diagram for describing kinds of prediction.
Figures 23, 24:
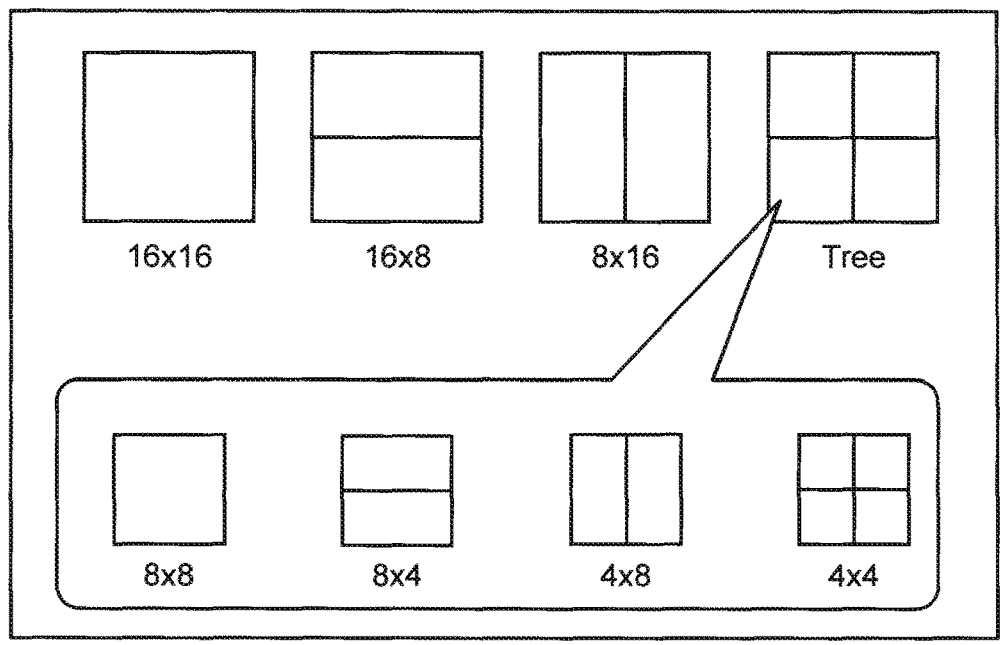
FIG. 23 It depicts an explanatory diagram showing prediction shapes of Tree in an AVC system.
FIG. 24 It depicts an explanatory diagram showing HEVCCB as HEVC coded data.
Figure 28:
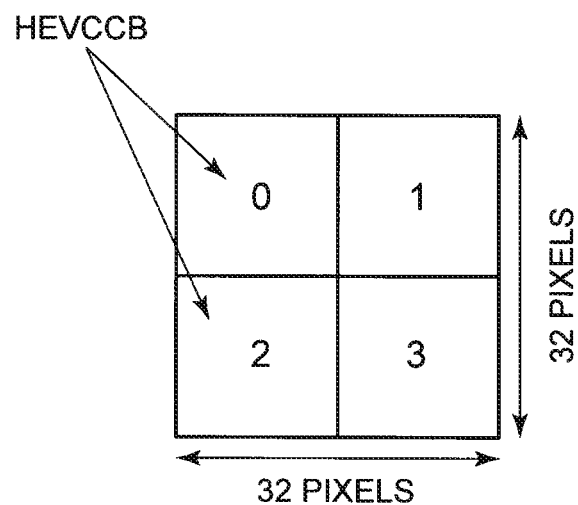
FIG. 28 It depicts an explanatory diagram showing an example of HEVCCB.
Figure 29:
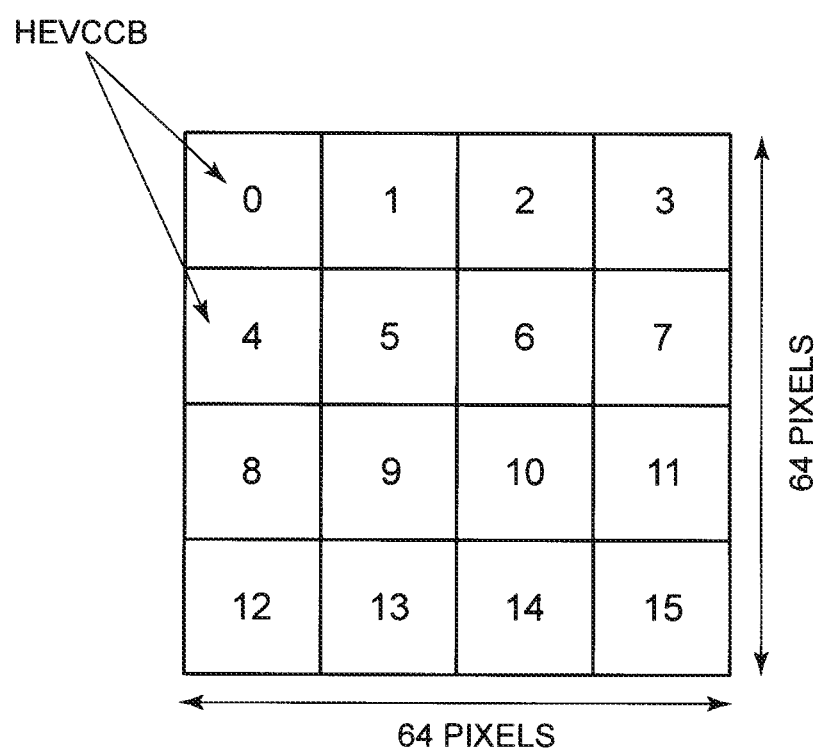
FIG. 29 It depicts an explanatory diagram showing another example of HEVCCB.
Figure 30:
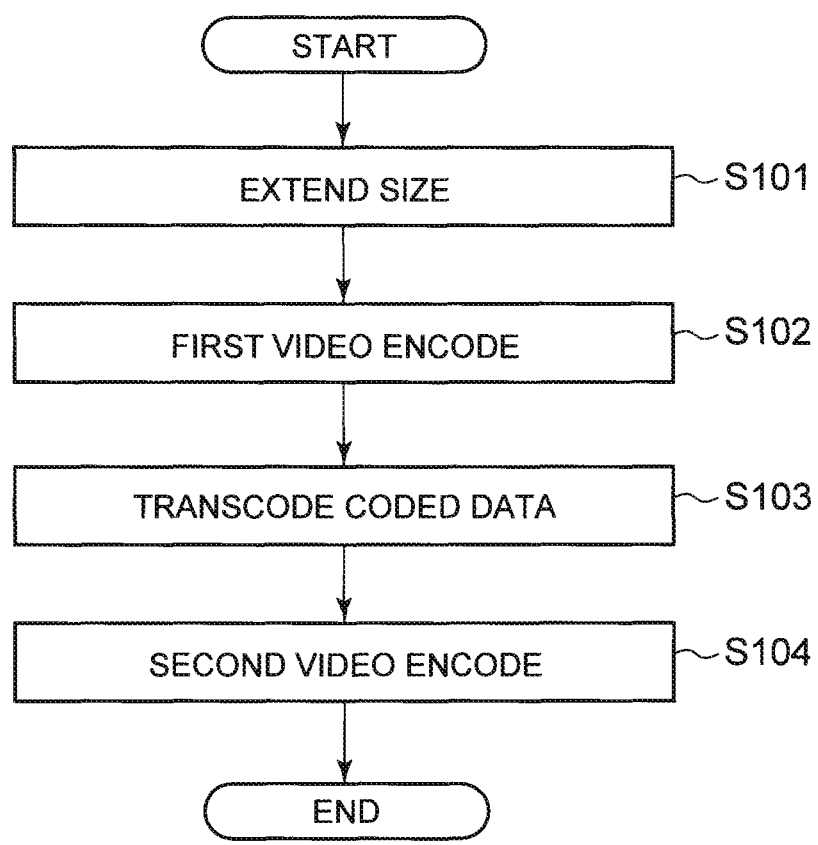
FIG. 30 It depicts a flowchart showing the operation of a video encoding device.

In step S121, the H.264 prediction mode transcoder 1041 executes the same process as the process by the coded data transcoder 1040 shown in FIG. 18 to perform processing for transcoding AVCMB to HEVCCB. FIG. 4 is an explanatory diagram for describing transcoding of prediction mode numbers in the transcoding processing. Referring to FIG. 11 and (b) in FIG. 21, prediction modes (in FIG. 4, numerals indicate prediction mode numbers) in the H.264/AVC system shown on the left side of FIG. 4 correspond to prediction modes in the H.265/HEVC system shown on the right side. Thus, as shown in FIG. 4, the H.264 prediction mode transcoder 1041 transcodes and outputs prediction modes. Specifically, the H.264 prediction mode transcoder 1041 outputs the prediction mode numbers of the H.265 prediction modes.

In step S122, the additional prediction mode generator 1042 generates a predetermined prediction mode. In the first embodiment, the additional prediction mode generator 1042 generates and outputs, as a temporary additional H.265 prediction mode, Planar prediction (prediction mode number 0) known to be often used. Specifically, the additional prediction mode generator 1042 outputs the prediction mode number of the temporary additional H.265 prediction mode.

In step S123, the prediction mode eliminator 1043 eliminates a temporary additional H.265 prediction mode that meets a predetermined condition. The predetermined condition is, for example, that the prediction mode is the same (the prediction mode number is the same) as the prediction mode output by the H.264 prediction mode transcoder 1041. In the first embodiment, since the additional prediction mode generator 1042 generates only Planar prediction, the prediction mode eliminator 1043 does not eliminate any temporary additional H.265 prediction mode.

In step S124, the prediction mode selector 1044 evaluates the prediction mode (H.265 prediction modes shown in FIG. 2) output by the H.264 prediction mode transcoder 1041 and the prediction mode (additional H.265 prediction modes shown in FIG. 2) output by the prediction mode eliminator 1043, and selects one prediction mode based on the evaluation results. The selected prediction mode is used by the transformer/quantizer 1051 in the second video encoder 105.

Figure 5:
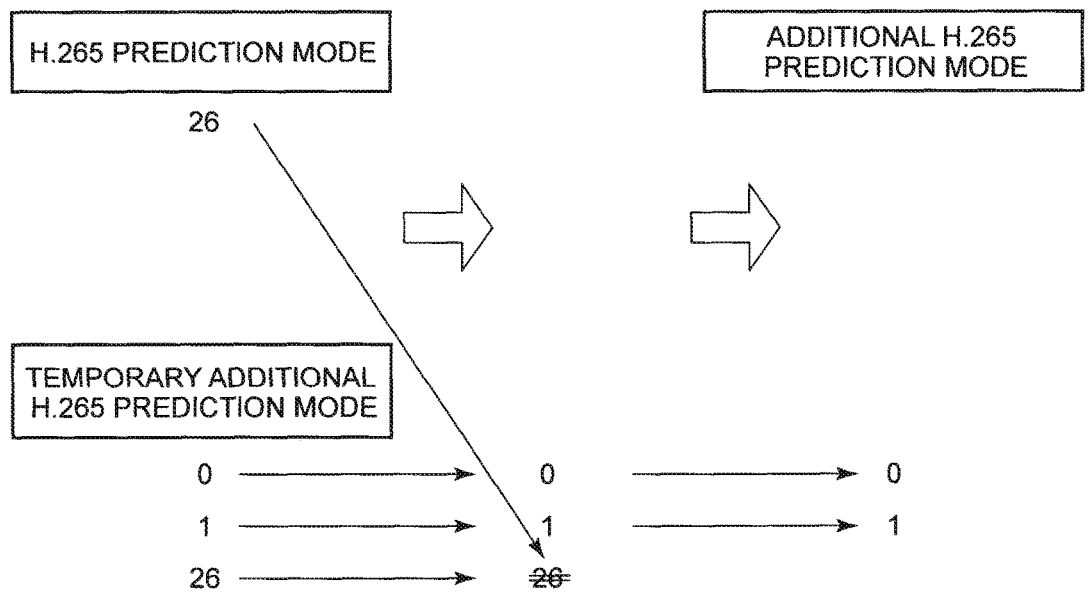
FIG. 5 It depicts an explanatory diagram for describing processing by a prediction mode eliminator.

FIG. 5 is an explanatory diagram for describing processing by the prediction mode eliminator 1043. In FIG. 5, it is shown an example (corresponding to a second embodiment to be described later) in which Planar prediction, DC prediction (prediction mode number 0), and vertical prediction (prediction mode number 26) are generated by the additional prediction mode generator 1042.

As shown in FIG. 5, it is assumed that the H.264 prediction mode transcoder 1041 outputs a prediction mode having the prediction mode number 26 as a prediction mode after the transcoding. In this case, the prediction mode having the prediction mode number 26 is duplicated with one of the temporary additional H.265 prediction modes. In such a case, the prediction mode eliminator 1043 eliminates the prediction mode having the prediction mode number 26 from the temporary additional H.265 prediction modes. The elimination of the prediction mode reduces the number of prediction modes evaluated by the prediction mode selector 1044.

Figure 6:
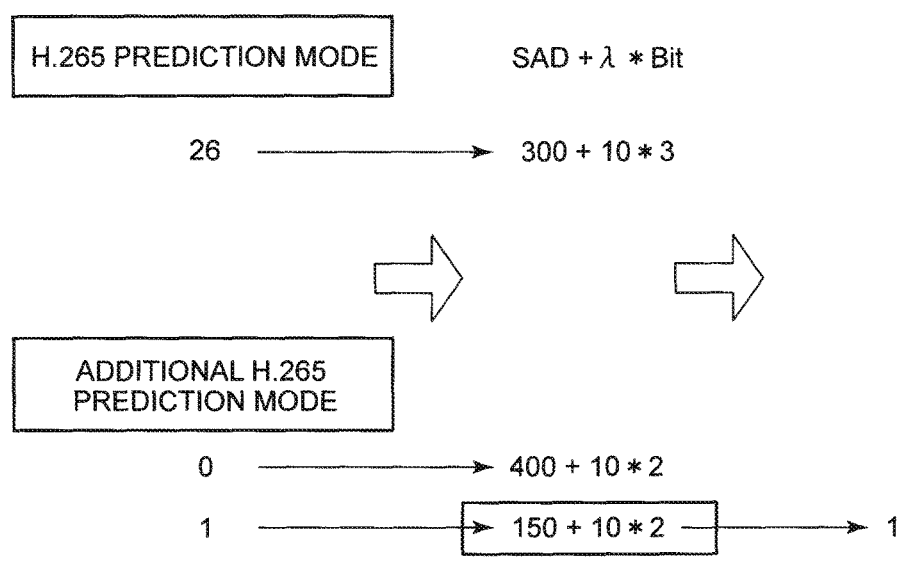
FIG. 6 It depicts an explanatory diagram showing an example of processing by a prediction mode selector.

FIG. 6 is an explanatory diagram showing an example of processing by the prediction mode selector 1044. In FIG. 6, it is shown an example in which the H.264 prediction mode transcoder 1041 outputs the prediction mode having the prediction mode number 26 as a prediction mode after the transcoding, and the prediction mode eliminator 1043 outputs Planar prediction and DC prediction as additional H.265 prediction modes.

For example, the prediction mode selector 1044 evaluates the prediction modes using Equation (2) as an evaluation formula.

$$J(\text{mode}) = D(\text{mode}) + \lambda \cdot \text{Bit} \quad (2)$$

J(mode) denotes the coding cost. λ denotes the Lagrange multiplier. Mode indicates a prediction mode number. D(mode) and Bit indicate coding distortion and the number of bits of a CU generated upon encoding using mode, respectively.

In the embodiment, the prediction mode selector 1044 uses, for example, SAD (Sum of Absolute Difference, i.e., sum of absolute error) as D(mode). SAD indicates an error (prediction distortion) between an image signal to be processed and a prediction signal. In the case of using SAD, the evaluation formula in Equation (2) is represented as Equation (3).

$$J(\text{mode}) = \text{SAD} + \lambda \cdot \text{Bit} \quad (3)$$

Based on Equation (3), the prediction mode selector 1044 calculates the coding cost of each prediction mode. Then, the prediction mode selector 1044 selects and outputs a prediction mode with the minimum coding cost.

In the example shown in FIG. 6, in regard to respective prediction modes of the prediction mode numbers 0, 1, and 26, the Lagrange multiplier is "10," SAD is "400," "150," and "300," and Bit is "2," "2," and "3," respectively. Since the coding cost of the prediction mode having the prediction mode number 1 is the minimum, the prediction mode selector 1044 selects the prediction mode having the prediction mode number 1.

In the embodiment, since the prediction mode selector 1044 evaluates predetermined prediction modes in addition to the prediction mode transcoded by the H.264 prediction mode transcoder 1041 to select a prediction mode used by the second video encoder 105 based on the evaluation results, the possibility that the second video encoder 105 can use a prediction mode higher in coding efficiency than the prediction modes transcoded by the H.264 prediction mode transcoder 1041 is increased. In other words, the coding efficiency can be improved.

Second Exemplary Embodiment

In the first embodiment, the additional prediction mode generator 1042 generates Planar prediction as a temporary additional H.265 prediction mode. In the second embodiment, the additional prediction mode generator 1042 generates temporary additional H.265 prediction modes as temporary additional H.265 prediction modes using the concept of MPM (Most Probable Mode) based on the H.265/HEVC standard.

In other words, since a block to be processed strongly correlates with neighboring blocks, the additional prediction mode generator 1042 sets prediction modes in the neighboring blocks as temporary additional H.265 prediction modes. In low bit coding in a flat region, an MPM prediction mode is likely to become a prediction mode high in coding efficiency. Further, in the embodiment, three MPMs (MPM0, MPM1, MPM2) are determined.

Figure 7:
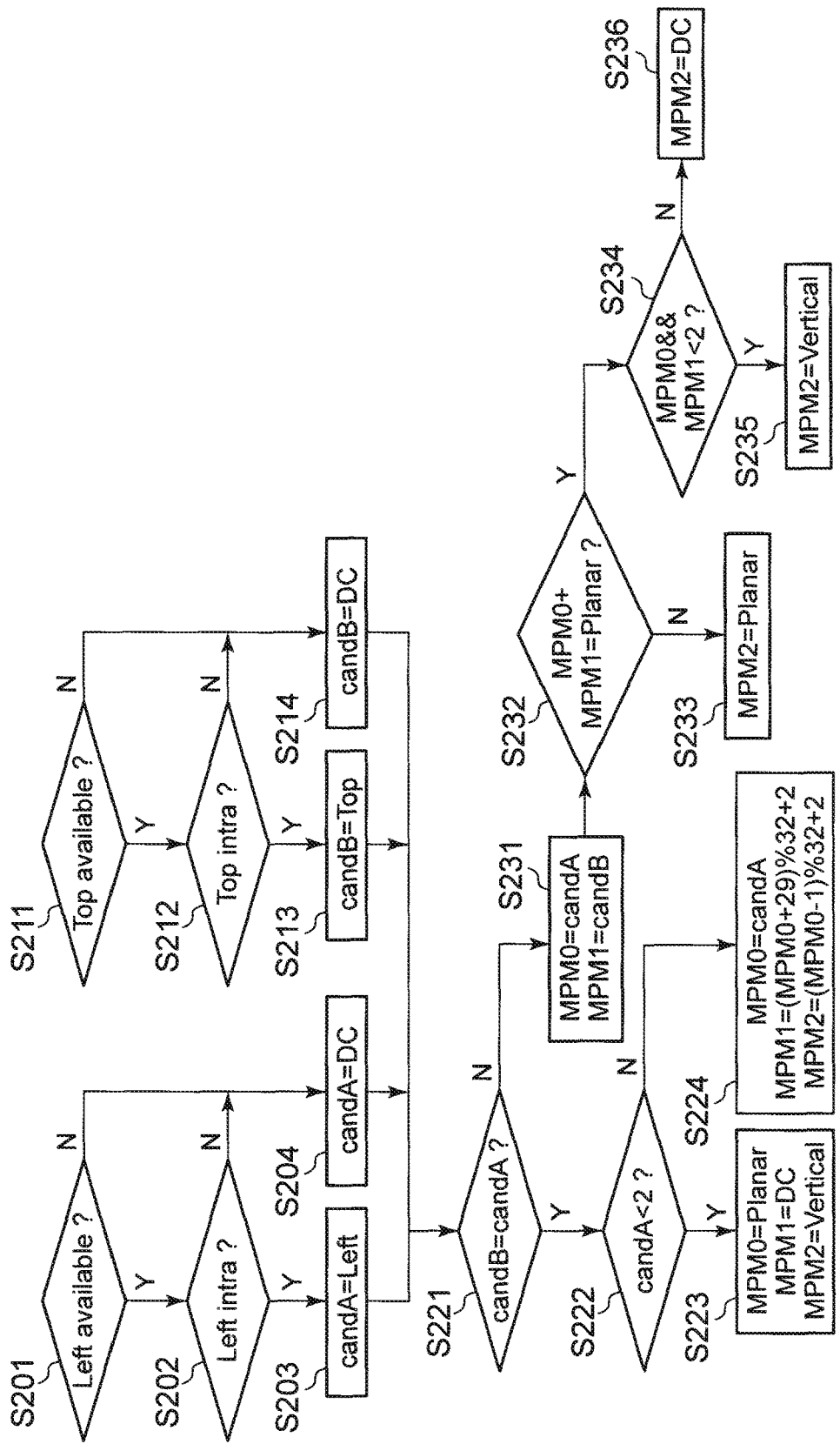
FIG. 7 It depicts a flowchart showing an example of an MPM selection method.

FIG. 7 is a flowchart showing a specific example of an MPM selection method executed by the additional prediction mode generator 1042. In step S201, the additional prediction mode generator 1042 checks whether a PU on the immediate left of a PU to be processed is usable (already processed). When the PU on the immediate left is not usable, the procedure proceeds to step S204. When the PU on the immediate left is usable and the intra prediction mode is applied, the additional prediction mode generator 1042 adds the prediction mode to candidate A (candA) (steps S202 and S203). When the intra prediction mode is not applied, the procedure proceeds to step S204. In step S204, the additional prediction mode generator 1042 adds DC prediction to candA.

Further, in step S211, the additional prediction mode generator 1042 checks whether a PU right above the PU to be processed is usable (already processed). When the PU right above is not usable, the procedure proceeds to step S214. When the PU right above is usable and the intra prediction mode is applied, the additional prediction mode generator 1042 adds the prediction mode to candidate B (candB) (steps S212 and S213). When the intra prediction mode is not applied, the procedure proceeds to step S214. In step S214, the additional prediction mode generator 1042 adds DC prediction to candB.

Further, in step S221, the additional prediction mode generator 1042 checks whether candA and candB are the same. If not the same, the procedure proceeds to step S231. When candA and candB are the same, the additional prediction mode generator 1042 checks whether the prediction mode number of candB is smaller than 2 (step S223). When the prediction mode number is smaller than 2, the additional prediction mode generator 1042 sets, in step S223, MPMs, i.e., temporary additional H.265 prediction modes as Planar prediction, DC prediction, and vertical prediction (MPM0=Planar, MPM1=DC, MPM2=Vertical). When the prediction mode number is 2 or more, the additional prediction mode generator 1042 adds, in step S224, candA as MPM0, (MPM0+29)%32+2 as MPM1, and (MPM0−1)%32+2 as MPM2 to temporary additional H.265 prediction modes, where %32 indicates a remainder when divided by 32.

In step S231, the additional prediction mode generator 1042 adds candA as MPM0 and candB as MPM1 to the temporary additional H.265 prediction modes. In step S232, the additional prediction mode generator 1042 checks whether either of MPM0 and MPM1 is Planar prediction. When at least either of them is Planar prediction, the procedure proceeds to step S234. When both of them are not Planar prediction, the additional prediction mode generator 1042 adds, in step S233, Planar prediction as MPM2 to the temporary additional H.265 prediction modes. Note that "+" denotes logical OR.

In step S234, the additional prediction mode generator 1042 checks whether prediction mode numbers of MPM0 and MPM1 are both smaller than 2. In other words, it checks whether the prediction mode that is not Planar prediction is DC prediction. Note that "&&" denotes logical AND. When both of the prediction mode numbers are smaller than 2, the additional prediction mode generator 1042 adds in step S235 vertical prediction as MPM2 to the temporary additional H.265 prediction modes. When either of the prediction mode numbers of MPM0 and MPM1 is a prediction mode larger than or equal to 2 (from step S232, either of them is Planar prediction having the prediction mode number 0), the additional prediction mode generator 1042 adds in step S236 DC prediction as MPM2 to the temporary additional H.265 prediction modes.

The three temporary additional H.265 prediction modes determined by the above processing make any of the following combinations:
 Planar prediction, DC prediction, vertical prediction
 Prediction mode of PU on the immediate left, prediction mode of PU right above, DC prediction
 Prediction mode of PU on the immediate left, prediction mode of PU right above, Planar prediction
 DC prediction (or Planar prediction), horizontal angular prediction (directional prediction), vertical angular prediction In other words, Planar prediction and vertical prediction relatively easy to appear are more likely to be included in the additional H.265 prediction modes. Note that the decision method for MPMs shown in FIG. 7 is just an example, and the method shown in FIG. 7 may be modified or any other method may be used to determine the MPMs.

Third Exemplary Embodiment

The additional prediction mode generator 1042 may also set, as temporary additional H.265 prediction modes, prediction modes in the neighborhood of a prediction mode output by the H.264 prediction mode transcoder 1041. Note that the neighborhood of the prediction mode means that the prediction mode numbers are approximate. In other words, it means that the prediction directions (angles) are similar (angular differences are small).

As an example, the additional prediction mode generator 1042 sets four prediction modes in the neighborhood of the prediction mode output by the H.264 prediction mode transcoder 1041 as temporary additional H.265 prediction modes. For example, when the H.264 prediction mode transcoder 1041 outputs a prediction mode having prediction mode number 7, the additional prediction mode generator 1042 sets prediction modes having prediction mode numbers 5, 6, 8, and 9 as temporary additional H.265 prediction modes.

When the H.264 prediction mode transcoder 1041 outputs DC prediction, any prediction mode similar in prediction direction cannot be identified. In this case, the additional prediction mode generator 1042 generates prediction modes of Planar prediction, vertical prediction, horizontal prediction, and oblique 45-degree prediction, the appearance frequencies of which are high.

The prediction mode output by the H.264 prediction mode transcoder 1041 (corresponding to a prediction mode in the H.264/AVC system before the transcoding) strongly correlates with the optimum prediction mode in the H.265/HEVC system to be used in the second video encoder. In other words, there is a high possibility that a prediction mode in the neighborhood of the prediction mode output by the H.264 prediction mode transcoder 1041 will become the optimum prediction mode (high in coding efficiency). As in the embodiment, if the additional prediction mode generator 1042 generates prediction modes in the neighborhood of the prediction mode number of a prediction mode output by the H.264 prediction mode transcoder 1041, a decrease in coding efficiency can be avoided.

In the first to third exemplary embodiments, the prediction mode selector 1044 calculates coding costs for additional H.265 prediction modes and H.265 prediction modes output by the H.264 prediction mode transcoder 1041, but coding costs may be calculated only for additional H.265 prediction modes. In this case, like in the first to third exemplary embodiments, the additional prediction mode generator 1042 generates prediction modes, the evaluation results of which are highly probable to be increased by the prediction mode selector 1044, as predetermined intra prediction modes usable by the second video encoder 105, but the prediction mode selector 1044 selects a prediction mode used by the second video encoder 105 from among the prediction modes generated by the additional prediction mode generator 1042 (without using the H.265 prediction modes output by the H.264 prediction mode transcoder 1041 as objects to be selected).

The additional prediction mode generator 1042 may also determine temporary additional H.265 prediction modes by a method with any combination of the generation methods for temporary additional H.265 prediction modes in the first to third exemplary embodiments.

In the aforementioned exemplary embodiments, the size extender 101 is provided, but a pixel bit depth converter may be provided in addition to the size extender 101. In this case, the pixel bit depth converter a 4:2:0 10-bit input image, whose size is extended to a multiple of 16 and which is supplied from the size extender 101, to a 4:2:0 8-bit image. In the bit depth transformation, the 2 LSBs may be dropped by right shift, or subjected to rounding.

The first video encoder 102 encodes, in the AVC system, the input image size-extended to the multiple of 16 and converted to 4:2:0 8-bit one.

The coded data transcoder 104 transcodes, to HEVCCB, AVC coded data of each macroblock in the input image size-extended to the multiple of 16, converted to 4:2:0 8-bit one, and supplied from the pixel bit depth converter.

The pixel bit depth converter reduces the pixel bit depth of the input image size-extended to the multiple of 16 and supplied from the size extender 101, but it may reduce the pixel bit depth of an input image input to the video encoding device. In this case, the size extender 101 is not provided.

The video encoding device may also include a down sampler. The first video encoder 102 is an AVC video encoder that supports the input format of 1080p (2K). The second video encoder is an HEVC video encoder. In other words, the spatial resolution supportable by the first video encoder 102 is less than the spatial resolution in the second video encoder 105.

The down sampler reduces a 2160p input image src (src_pic_width=3840, src_pic_height=2160) to 1080p (src_pic_width=1920, src_pic_height=1080). Further, the down sampler extends, to multiples of 16, the width src_pic_width and height src_pic_height of the input image reduced to 1080p. Note that a pixel value of an area the size of which is extended may be a copy of the pixel value of a boundary with the input image reduced to 1080p, or may be a predefined pixel value (e.g., 128 indicating a gray color (in the case of an 8-bit input image)).

The first video encoder 102 encodes, in the AVC system, the input image reduced to 1080p, extended to the multiples of 16, and supplied from the down sampler.

The coded data transcoder 104 transcodes, to HEVCCB, AVC coded data of each macroblock of the divided screen that forms the input image reduced to 1080p, extended to the multiples of 16, and supplied from the down sampler. Note that the coded data transcoder 104 doubles cu_size, tu_size, and the horizontal component value and vertical component value of a motion vector in motion information considering that the resolution of the input image to the first video encoder 102 is half that of the input image to the second video encoder 105 horizontally and vertically.

Then, when part_mode of adjacent four pieces of HEVCCB is all 2N×2N, and cu_size, pred_mode_flag, and motion information (ref_idx_10, ref_idx_11, mv_10, and mv_11) are all the same like in the aforementioned exemplary embodiments, the coded data transcoder 104 merges the four pieces of HEVCCB. Specifically, the coded data transcoder 104 updates cu_size in the four pieces of HEVCCB to 64 considering that the resolution of the input image to the first video encoder 102 is half that of the input image to the second video encoder 105 horizontally and vertically.

Like in the aforementioned exemplary embodiments, the second video encoder 105 encodes, in the HEVC system, a 2160p input image supplied from the buffer 103 based on HEVC coded data supplied from the first video encoder 102 to output a bitstream.

When the video encoding device is configured to include a down sampler, the video encoding device can support the input format of 2160p (4K) in the HDTV (High Definition Television) standard.

The video encoding device of any of the aforementioned exemplary embodiments can be configured by hardware, but it can also be implemented by a computer program.

Figure 8:
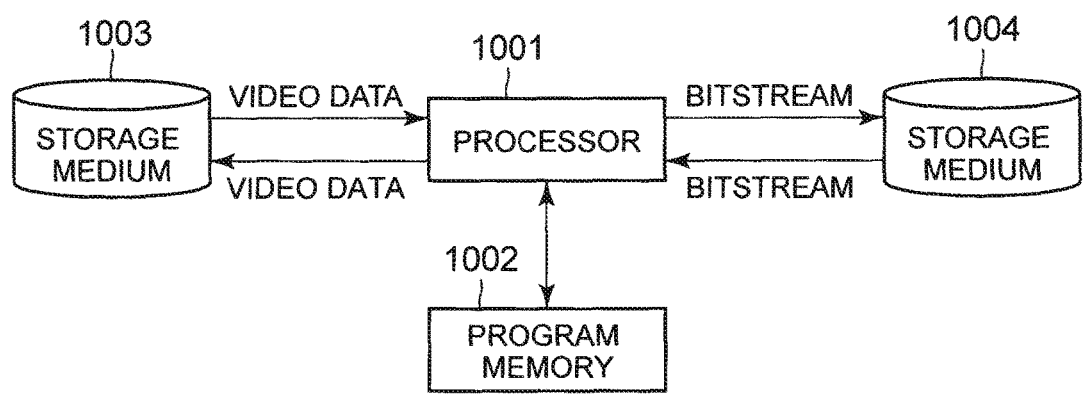
FIG. 8 It depicts a block diagram showing a configuration example of an information processing system capable of implementing the functions of a video encoding device according to the present invention.

An information processing system shown in FIG. 8 includes a processor 1001, a program memory 1002, a storage medium 1003 for storing video data, and a storage medium 1004 for storing a bitstream. The storage medium 1003 and the storage medium 1004 may be different storage media, or may be storage areas on the same storage medium. As the storage medium, a magnetic storage medium such as a hard disk can be used.

In the information processing system shown in FIG. 8, a program for implementing the function of each block (except for those of the buffer blocks) shown in FIG. 1 and FIG. 2 is stored in the program memory 1002. Then, the processor 1001 performs processing according to the program stored in the program memory 1002 to implement the functions of the video encoding device of the aforementioned embodiments.

Figure 9:
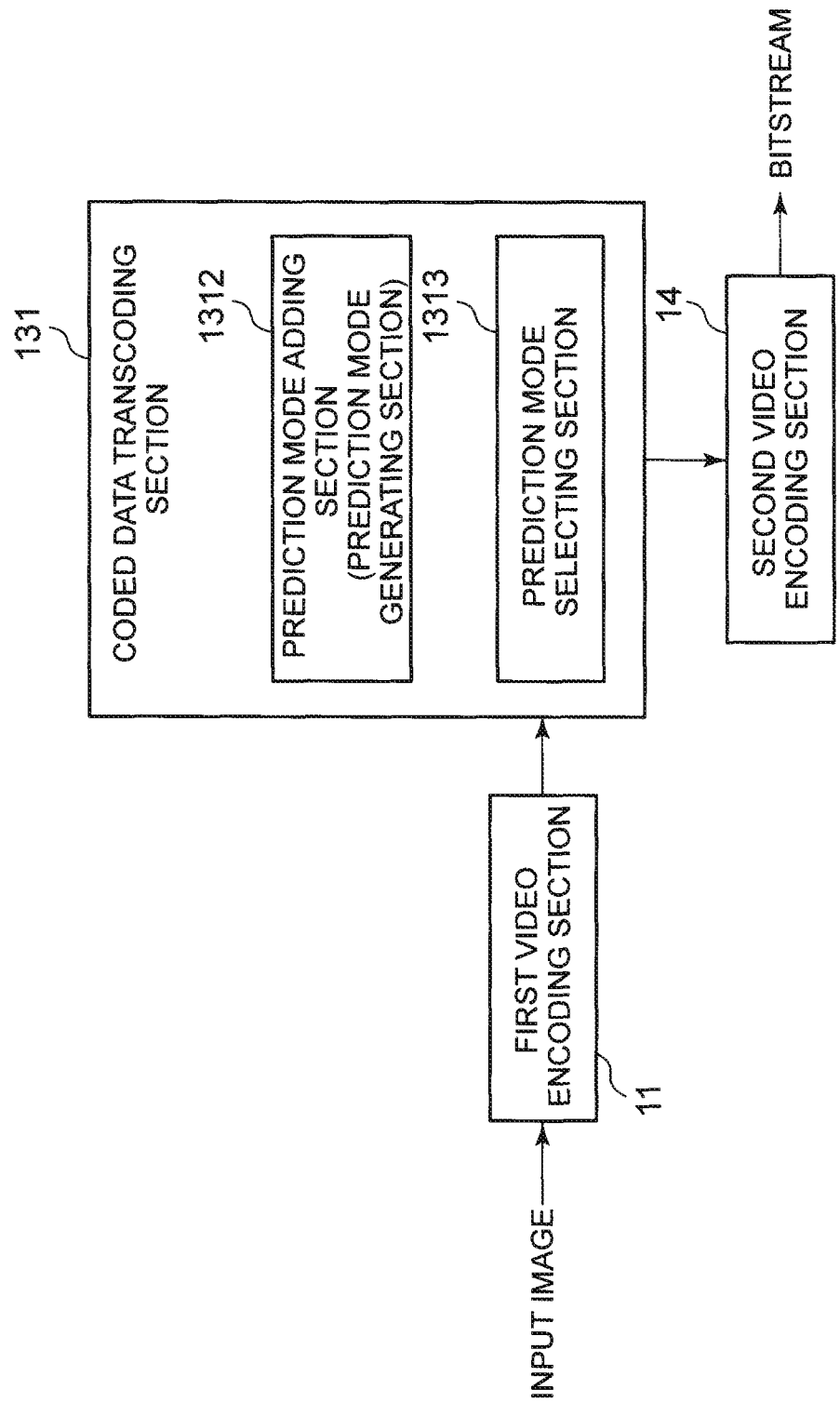
FIG. 9 It depicts a block diagram showing a main part of a video encoding device.

FIG. 9 is a block diagram showing a main part of a video encoding device according to the present invention. As shown in FIG. 9, the video encoding device includes: a first video encoding section 11 (as an example, the first video encoder 102 shown in FIG. 1) for encoding an input image to generate first coded data; a coded data transcoding section 131 (as an example, the coded data transcoder 104 shown in FIG. 1) for transcoding the first coded data generated by the first video encoding section 11 to generate second coded data; and a second video encoding section 14 (as an example, the second video encoder 105 shown in FIG. 1) for generating a prediction signal based on the second coded data supplied from the coded data transcoding section 131, wherein the coded data transcoding section 131 includes a prediction mode adding section (prediction mode generating section) 1312 (as an example, the additional prediction mode generator 1042 shown in FIG. 2) for generating predetermined intra prediction modes usable by the second video encoding section 14, and a prediction mode selecting section 1313 (as an example, the prediction mode selector 1044 shown in FIG. 2) for evaluating the prediction modes generated by the prediction mode generating section 1312 to select a prediction mode used by the second video encoding section 14 based on the evaluation results, and the prediction mode generating section 1312 generates, as the predetermined intra prediction modes, prediction modes, the evaluation results of which are highly probable to be increased by the prediction mode selecting section 1313.

Figure 10:
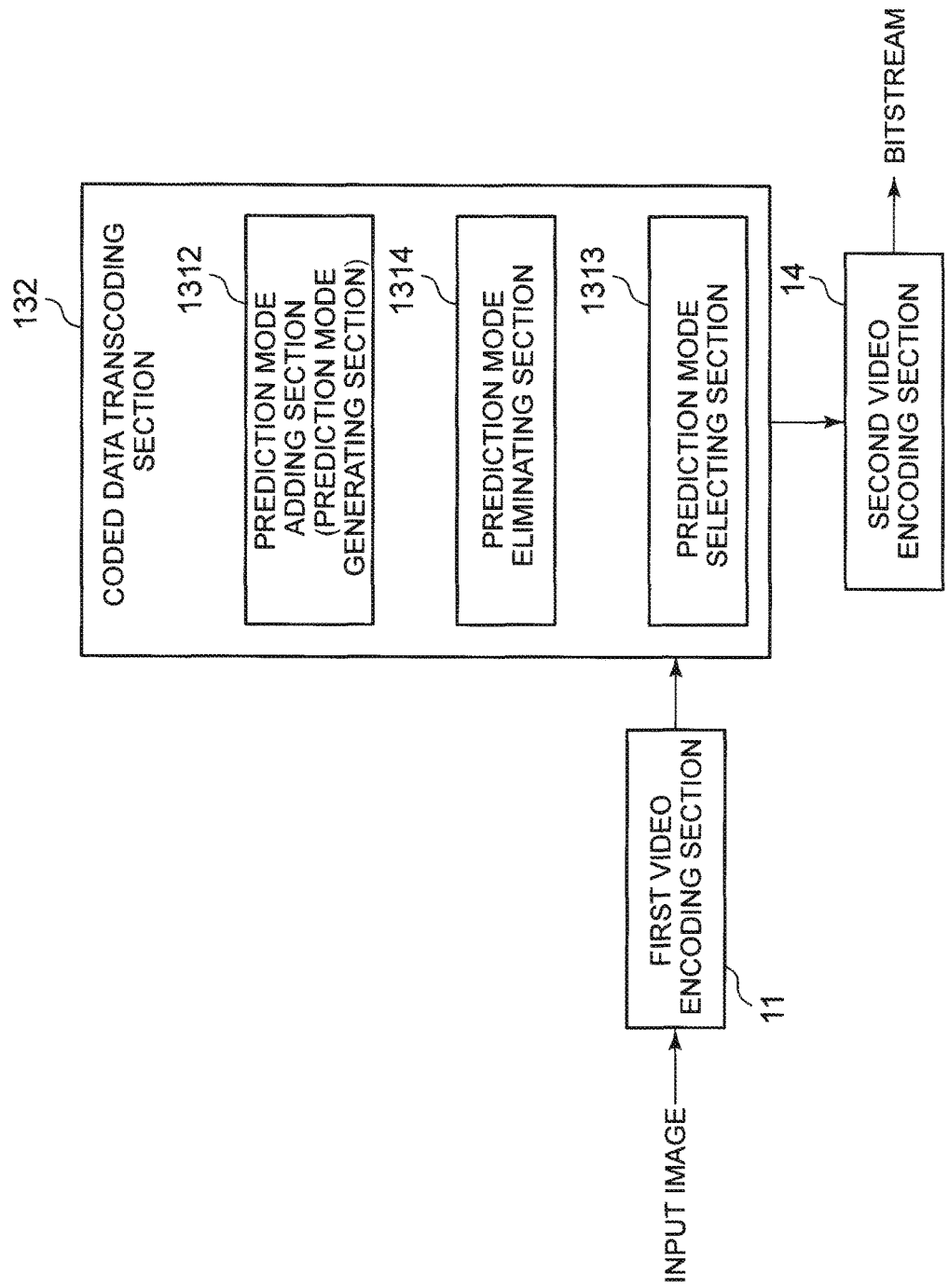
FIG. 10 It depicts a block diagram another example of the video encoding device.

FIG. 10 is a block diagram showing a main part of another video encoding device according to the present invention. In addition to the configuration of the video encoding device shown in FIG. 9, the video encoding device shown in FIG. 10 is provided with a prediction mode eliminating section 1314 (as an example, the prediction mode eliminator 1043 shown in FIG. 2) for eliminating a prediction mode that meets a predetermined condition from the prediction modes generated by the prediction mode generating section 1312 in the coded data transcoding section 132.

While the aforementioned exemplary embodiments may be partly or wholly described in the following supplementary notes, the present invention is not limited to the following configurations.

(Supplementary note 1) A video encoding device including: first video encoding means for encoding an input image to generate first coded data; coded data transcoding means for transcoding the first coded data generated by the first video encoding means to generate second coded data; and second video encoding means for generating a prediction signal based on the second coded data supplied from the coded data transcoding means, wherein the coded data transcoding means includes a prediction mode transcoding section for transcoding an intra prediction mode by the first video encoding means to an intra prediction mode used by the second video encoding means, a prediction mode adding section for generating predetermined intra prediction modes usable by the second video encoding means as prediction modes to be added to the prediction mode transcoded by the prediction mode transcoding section, and a prediction mode selecting section for evaluating the prediction mode transcoded by the prediction mode transcoding section and the prediction modes generated by the prediction mode adding section to select a prediction mode used by the second video encoding means based on the evaluation results, and the prediction mode adding section generates, as the predetermined intra prediction modes, prediction modes the evaluation results of which are highly probable to be increased by the prediction mode selecting section.

(Supplementary note 2) A video encoding method for encoding an input image to generate first coded data, storing the input image in a buffer, transcoding the first coded data to generate second coded data, and generating a prediction signal based on the second coded data, wherein upon transcoding the first coded data, an intra prediction mode pertinent to the first coded data is transcoded to an intra prediction mode pertinent to the second coded data, predetermined intra prediction modes usable to generate a prediction signal based on the second coded data are generated, the transcoded prediction mode and the generated prediction modes are evaluated, a prediction mode used to generate the second coded data is selected based on the evaluation results, and wherein prediction modes, the evaluation results of which are highly probable to be increased, are generated as the predetermined intra prediction modes.

(Supplementary note 3) A video encoding program for causing a computer to execute a process of encoding an input image to generate first coded data, a process of transcoding the first coded data to generate second coded data, and a process of generating a prediction signal based on the second coded data, wherein upon transcoding of the first coded data, the program causes the computer to execute: a process of transcoding an intra prediction mode pertinent to the first coded data to an intra prediction mode pertinent to the second coded data; a process of generating predetermined intra prediction modes usable to generate the prediction signal based on the second coded data; and a process of evaluating the transcoded prediction mode and the generated prediction modes and, based on the evaluation results, selecting a prediction mode used to generate the second coded data, and wherein prediction modes, the evaluation results of which are highly probable to be increased, are generated as the predetermined intra prediction modes.

(Supplementary note 4) A video encoding program for causing a computer to execute: a process of encoding an input image to generate first coded data; a process of transcoding the first coded data to generate second coded data; and a process of generating a prediction signal based on the second coded data, wherein upon transcoding of the first coded data, the program causes the computer to execute: a process of generating at least intra prediction modes unusable to generate the first coded data and usable to generate the second coded data; and a process of evaluating the generated prediction modes and, based on the evaluation results, selecting a prediction mode used to generate the second coded data, and wherein an encoding process based on the H.264/AVC standard is executed to generate the first coded data, and an encoding process based on the H.265/HEVC standard is executed to generate the second coded data.

(Supplementary note 5) The video encoding program according to supplementary note 3 or supplementary note 4, wherein the program causes the computer to generate a Planar prediction mode as a predetermined intra prediction mode usable to generate the prediction signal.

(Supplementary note 6) The video encoding program according to supplementary note 3, supplementary note 4, or supplementary note 5, wherein the program causes the computer to generate prediction modes based on MPM as predetermined intra prediction modes usable to generate the prediction signal.

(Supplementary note 7) The video encoding program according to supplementary note 3, supplementary note 4, supplementary note 5, or supplementary note 6, wherein the program causes the computer to generate prediction modes in the neighborhood of a prediction mode number of the transcoded prediction mode as predetermined intra prediction modes usable to generate the prediction signal.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2014-023090 filed on Feb. 10, 2014, the disclosures of which are incorporated herein in their entirety.

REFERENCE SIGNS LIST 11 first video encoding section
14 second video encoding section
101 size extender
102 first video encoder
103 buffer
104, 1040 coded data transcoder
105 second video encoder
131, 132 coded data transcoding section
1001 processor
1002 program memory
1003, 1004 storage medium
1021, 1051 transformer/quantizer
1022, 1052 inverse quantizer/inverse transformer
1023, 1053 buffer
1024, 1054 predictor
1025, 1055 estimator
1041 H.264 prediction mode transcoder
1042 additional prediction mode generator
1043 prediction mode eliminator
1044 prediction mode selector
1056 entropy encoder
1312 prediction mode adding section (prediction mode generating section)
1313 prediction mode selecting section
1314 prediction mode eliminating section

What is claimed is:

1. A video encoding device comprising:
a memory; and
a processor configured to access the memory and thereby implement:
 first video encoding section configured to encode an input image to generate first coded data;
 coded data transcoding section configured to transcode the first coded data generated by the first video encoding section to generate second coded data, and configured to generate a prediction mode for the second coded data by transcoding a prediction mode for the first coded data; and
 second video encoding section configured to generate a prediction signal for the input image inputted to the first video encoding section, based on the second coded data supplied from the coded data transcoding section, wherein the coded data transcoding section includes:
  a prediction mode generating section configured to generate at least intra prediction modes unusable by the first video encoding section and usable by the second video encoding section, and
  a prediction mode selecting section configured to evaluate the intra prediction modes generated by the prediction mode generating section, and configured to select an intra prediction mode with the minimum coding cost as the intra prediction mode used by the second video encoding section,
wherein
 the first video encoding section is further configured to execute an encoding process based on an H.264/AVC standard, and
 the second video encoding section is further configured to execute an encoding process based on an H.265/HEVC standard.

2. The video encoding device according to claim 1, wherein the prediction mode generating section is configured to generate a Planar prediction mode.

3. The video encoding device according to claim 1, wherein the prediction mode generating section is configured to generate prediction modes based on most probable mode (MPM).

4. The video encoding device according to claim 1, wherein
 the coded data transcoding section includes a prediction mode transcoding section configured to transcode an intra prediction mode by the first video encoding section to an intra prediction mode used by the second video encoding section, and
 the prediction mode generating section is further configured to generate prediction modes in neighborhood of a prediction mode number of the prediction mode transcoded by the prediction mode transcoding section.

5. The video encoding device according to claim 1, wherein the coded data transcoding section includes a prediction mode eliminating section configured to eliminate a prediction mode that meets a predetermined condition from the prediction modes generated by the prediction mode generating section.

6. The video encoding device according to claim 1, wherein the coded data transcoding section includes a prediction mode eliminating section configured to eliminate a prediction mode that meets a predetermined condition from the prediction modes generated by the prediction mode generating section.

7. The video encoding device according to claim 6, wherein
 the coded data transcoding section includes a prediction mode transcoding section configured to transcode an intra prediction mode by the first video encoding section to an intra prediction mode used by the second video encoding section, and
 the prediction mode generating section is configured to generate prediction modes in neighborhood of a prediction mode number of the prediction mode transcoded by the prediction mode transcoding section.

8. A video encoding method comprising:
encoding an input image to generate first coded data;
transcoding the first coded data to generate second coded data;

generating a prediction mode for the second coded data by transcoding a prediction mode for the first coded data; and generating a prediction signal for the input image which is inputted to encoding process for generating the first coded data, based on the second coded data, wherein the method includes:

generating at least intra prediction modes unusable to generate the first coded data and usable to generate the second coded data; and evaluating the generated intra prediction modes, and selecting an intra prediction mode with the minimum coding cost as the intra prediction mode used to generate the second coded data, wherein an encoding process based on an H.264/AVC standard is executed to generate the first coded data, and an encoding process based on an H.265/HEVC standard is executed to generate the second coded data.

9. The video encoding method according to claim 8, wherein a Planar prediction mode is generated as an intra prediction mode usable to generate the second coded data.

10. The video encoding method according to claim 8, wherein prediction modes based on most probable mode (MPM) are generated as intra prediction modes usable to generate the second coded data.

11. The video encoding method according to claim 8, wherein based on transcoding of the first coded data, transcoding an intra prediction mode pertinent to the first coded data to an intra prediction mode pertinent to the second coded data, and generating prediction modes in neighborhood of a prediction mode number of the transcoded prediction mode as intra prediction modes usable to generate the second coded data.

12. The video encoding method according to claim 8, wherein a prediction mode that meets a predetermined condition is eliminated from the generated prediction modes.

13. The video encoding method according to claim 8, wherein a prediction mode that meets a predetermined condition is eliminated from the generated prediction modes.

14. The video encoding method according to claim 13, wherein based on transcoding of the first coded data, transcoding an intra prediction mode pertinent to the first coded data to an intra prediction mode pertinent to the second coded data, and generating prediction modes in neighborhood of a prediction mode number of the transcoded prediction mode as intra prediction modes usable to generate the second coded data.

15. A non-transitory computer readable information recording medium storing a program when executed by a processor, causes the processor to perform:

encoding an input image to generate first coded data;

transcoding the first coded data to generate second coded data;

generating a prediction mode for the second coded data by transcoding a prediction mode for the first coded data;

generating a prediction signal for the input image which is inputted to encoding process for generating the first coded data, based on the second coded data;

generating at least intra prediction modes unusable to generate the first coded data and usable to generate the second coded data; and evaluating the generated intra prediction modes, and selecting an intra prediction mode with the minimum coding cost as the intra prediction mode used to generate the second coded data, wherein an encoding process based on an H.264/AVC standard is executed to generate the first coded data, and an encoding process based on an H.265/HEVC standard is executed to generate the second coded data.

16. The non-transitory computer readable information recording medium according to claim 15, further comprising eliminating a prediction mode that meets a predetermined condition from the generated prediction modes.

* * * * *